United States Patent [19]
Gibbons et al.

[11] Patent Number: 5,761,511
[45] Date of Patent: Jun. 2, 1998

[54] METHOD AND APPARATUS FOR A TYPE-SAFE FRAMEWORK FOR DYNAMICALLY EXTENSIBLE OBJECTS

[75] Inventors: Jonathan J. Gibbons; Michael J. Day, both of Mountain View; Theodore C. Goldstein; Michael J. Jordan, both of Palo Alto, all of Calif.

[73] Assignee: Sun Microsystems, Inc., Palo Alto, Calif.

[21] Appl. No.: 187,972

[22] Filed: Jan. 28, 1994

[51] Int. Cl.$^6$ .................................................. G06F 9/45
[52] U.S. Cl. .................................................. 395/705
[58] Field of Search .................. 395/700, 164, 395/685, 701, 702, 705

[56] References Cited

U.S. PATENT DOCUMENTS

| | | | |
|---|---|---|---|
| 5,315,703 | 5/1994 | Matheny et al. | 395/164 |
| 5,339,438 | 8/1994 | Conner et al. | 395/700 |
| 5,361,350 | 11/1994 | Conner et al. | 395/600 |
| 5,418,964 | 5/1995 | Conner et al. | 395/700 |
| 5,421,016 | 5/1995 | Conner et al. | 395/700 |
| 5,428,792 | 6/1995 | Conner et al. | 395/700 |
| 5,493,680 | 2/1996 | Danforth | 395/700 |
| 5,502,839 | 3/1996 | Kolnick | 395/800 |

FOREIGN PATENT DOCUMENTS

| | | | |
|---|---|---|---|
| A-0 361 737 | 9/1989 | European Pat. Off. | G06F 15/419 |
| A-0 546 682 | 11/1992 | European Pat. Off. | G06F 9/44 |

OTHER PUBLICATIONS

IBM Technical Disclosure Bulletin, vol. 35, No. 4B, Sep. 1992, Armonk, NY, pp. 460–463.
IBM Technical Disclosure Bulletin, vol. 36, No. 6B, Jun. 1993, Armonk, NY, pp. 509–511.
Proceedings of the Object Oriented Programming Systems Languages and Applications Conference, vol. 24, 1–6 Oct. 1989, New Orleans, pp. 49–70.
Computer Journal, vol. 33, No. 3, Jun. 1990, Cambridge, GB, pp. 279–280.
"An Extensible Programming Environment for Modula-3" by Mick Jordan, ACM Proceedings SIGSOFT '90 (Irvine, CA), pp. 66–76.
Smid et al., "Two Models for the Reconstruction Problem for Dynamic Data Structures," Journal of Information Processing and Cybernetics, vol. 25 (1989) num 4, pp. 131–155.

*Primary Examiner*—James P. Trammell
*Assistant Examiner*—Peter J. Corcoran, III
*Attorney, Agent, or Firm*—Beyer & Weaver, LLP

[57] ABSTRACT

The present invention provides a system and process for making use of pre-existing data-structures which represent a computer program, in a way which has the advantages of shortening the time and cost required to create a new version of the computer program. The pre-existing data-structure is modified to produce a shadow data-structure which contains only shadows of those elements or nodes of the pre-existing data-structure required to perform the tasks of the new version of the computer program. The present invention includes processes to make the data-structure of the original program shadowable; processes to use data from the original program compilation process in compiling the new version of the program, including processes to create a shadow data-structure; and processes to use the new version of the computer program along with the shadow data-structure to create the desired execution. This new version of the computer program is typically a tool for checking or observing the original program's execution in some manner. Moreover, the system and processes disclosed provide mechanisms for a software manufacturer to create type-safe versions of a connected collection of objects which are dynamically extensible.

23 Claims, 20 Drawing Sheets

Syntax tree for "position : = A + B * 60"

The data structure in (b) is for the tree in (a).

A simple data structure and its shadow

A data structure and its shadow, showing the shadow map

Using back pointers to reduce the size of the shadow data structure

Primary classes and methods used to implement shadows

Class structure for example data structure

Subroutine to shadow any node of a shadowable data structure example method for shadow factory to create a shadow node Implementation responsibilities

| Class or methods | Responsibility |
|---|---|
| LazyShadow | Standard shadow library code |
| Shadowable | Standard shadow library code |
| ShadowMap | Standard shadow library code |
| T::create_shadow (declaration) (definition) | Data structure being shadowed Autodefine |
| TRoot_ShadowMap (class definition and default methods) | Autodefine |
| T'_from_T_ShadowMap (declaration and methods) | Shadow data structure |
| T'::shadow (declaration) (definition) | Shadow data structure Autodefine |
| T'::narrow (declaration) (definition) | Shadow data structure Autodefine |
| T'::narrow_to (declaration) (definition) | Shadow data structure Autodefine |

*Explanation of symbols*

| | |
|---|---|
| T | Prototype class in shadowed data structure |
| TRoot | Common root class for all classes in shadowed data structure |
| T' | Prototype class in shadow data structure |
| T'_Factory | Name of factory for shadow data structure |

*FIG. 19*

METHOD AND APPARATUS FOR A TYPE-SAFE FRAMEWORK FOR DYNAMICALLY EXTENSIBLE OBJECTS

BACKGROUND OF THE INVENTION

1. Field of the Invention

The present invention relates to the field of computer systems, and in particular, to programming language compilers, interpreters and related auxiliary systems. More specifically, the present invention relates to extending the functionality of data structures, where the data structures are made up of connected collections of objects, and to mechanisms for projecting such data structures of objects from one type space to another.

2. Background

The implementation of modern programming languages, including object oriented programming languages, is generally performed by the use of programs called Compilers. A Compiler is a program that reads a program written in one language—the source language—and translates it into an equivalent program in another language—the target language. A particular example of such Compilers which are used with object oriented programs is the C++ compiler.

Shown in FIG. 1 is one embodiment of a compiler 42, comprising a lexical analyzer and parser 44, an intermediate representation builder 46, a semantic analyzer 48, and a code generator 50. These elements are sequentially coupled to each other. Together, they transform program source code 52 into tokenized statements 54, intermediate representations 56, annotated intermediate representations 58, and ultimately intermediate form code 60 with data references made on a symbolic basis. The annotated intermediate representation 58 is preferably referred to as an Annotated Semantic Graph (ASG). The lexical analyzer and parser 44, the intermediate representation builder 46, and the semantic analyzer 48 are intended to represent a broad category of these elements found in most compilers. The constitutions and basic functions of these elements are well known and will not be otherwise described further here. Similarly, a variety of well known tokens, intermediate representations, annotations, and intermediate forms may also be used to practice the present invention.

During the analysis phase of the compilation, the operations implied by the source program are determined and recorded in a hierarchical structure called a Syntax Tree or more generally, an Abstract Syntax Tree (AST). Referring now to FIG. 2 an AST for the expression "position :=A +B*60" is illustrated. In this type of tree, each node 12, 14, 16 represents an operation, and the children of a node 20, 22, 18 represent the arguments of the operation. (This AST, when modified to describe the semantic relationships of the elements of the tree, is also preferable referred to as an Annotated Semantic Graph (ASG) described above.) Referring now to FIG. 3 the expression "position :=A+B*60" is illustrated as the more general expression "id1:=id2+ id3*60(a number for example)" 30, in FIG. 3(a), which can be represented as a data structure 31, for example in an intermediate representation form called a "three-address code" form as shown in FIG. 3(b). This type of three-address code data structure 31 is like the assembly language for a machine in which every memory location can act like a register. Each three-address code instruction 38 has at most one operator 32 and a left hand operand 34 and a right hand operand 36.

For further descriptions of various parsers, intermediate representation builders, semantic analyzers, three-address code representations, and code generators, see A.V. Aho, R. Sethi, and J. D. Ullman, *Compilers: Principles, Techniques, and Tools*, Addison-Wesley, 1986, pp. 25–388, and 463–512, ISBN 0-201-10088-6.

In an object oriented system, an object is a component comprising data and operations which can be invoked to manipulate the data. The operations are invoked on the object by sending calls to the object. Each object has an object type. The object type defines the operations that can be performed on objects of that type. The object operations are implemented independent of the objects themselves. Additionally, one object type may inherit the object operations defined and implemented for other object types. For further description of object oriented design and programming techniques see "Object-oriented Software Construction" by Bertrand Meyer, Prentice-Hall 1988 ISBN 0-13-629049-3.

In modern object oriented language compilers such as C++, the Annotated Semantic Graphs ("ASGs") and their corresponding data structures are represented as connected collections of objects, wherein each node and leaf of a data structure is an object which has its own internal data structure and some methods. As a result, the source code of a large object oriented program will generate a very large ASG and related data structure (which is itself a very large object-oriented program) as an intermediate representation in the compilation process. Many of such compilers do not expose this ASG to users but merely use it as the input to the code generator of the compiler for production of the object code of the program being compiled.

The success of any programming language depends to a large extent on the set of tools (in addition to the basic compiler and linker) which enable the construction and modification of application programs, and on the ease and utility with which the tools can be used. Tools such as debuggers, code browsers, code analyzers, style analyzers, and other ad hoc programs can enhance the utility of application programs if such tools are available and easy to use. Additionally, if the construction of new tools is made easy enough, new and powerful tools will appear. In order to enhance the development of new tools and to facilitate the construction of such tools, recent developments in the field have encouraged the exposure of the ASG by modifications to compilers to output the ASG data structure, to store this data structure in an object data base so that it is useable by and available to other programs. See, for example, the paper titled "An Extensible Programming Environment for Modula-3" by Mick Jordan, ACM Proceedings SIGSOFT '90 (Irvine, Calif.), pages 66–76.

The Problem

Even though this ASG in the form of a collection of interconnected objects, of a variety of object types, is made available to tool developers, there are many problems associated with using it.

In an object oriented program it is common to have a collection of interconnected objects, of a variety of types. To manipulate such a collection it is often desirable to be able to extend the functionality of the individual objects, in different ways for different and independent clients (such as tool developers in this case), and possibly for multiple clients at a time. The complete set of potential clients may not be known when the code for the collection is compiled, or when the collection is actually built. Furthermore, it is desirable to be able to extend the functionality of the various objects in a manner which preserves the type compatibility rules. That is, it is desirable to allow an entity to refer to a sub-class but not allow a sub-class to refer to a class. This is referred to below as extending the functionality of the objects in a type-safe manner.

There is another aspect to the problem. Even if it were possible to modify the objects to support all the desired extra functionality, it might not be desirable to do so. To add lots of methods (and the instance data required by their implementation) can lead to an effect called interface bloat, in which objects pay the cost of all that functionality whether they use it or not. That is, as users begin to use the ASG objects, they would add methods, which requires a recompilation of the code. As more methods are added, the objects are necessarily made more complex to function, to use, to explain, etc., and require more internal memory space for storage. And as these objects grow bigger through the addition of additional methods, the data base of these objects must be made bigger. Therefore what is needed is a way to use the ASG objects without the necessity for recompilation and without the necessity of using all of the pre-existing methods of the objects if they are not required for the new application.

The problem is not specific to any one programming language, but is exacerbated by the presence of inheritance. This is because inheritance introduces the difference between the static and the dynamic type of an object. In this specification, C++ is used for the examples and for framing a solution to these problems. See for example, "The Annotated C++ Reference Manual" Ellis and Stroustrup, Addison-Wesley 1990, ISBN 0-201-51459-1.

As more fully described below, the present invention is a type-safe framework for dynamically extensible objects which is applicable to the problem of making a large data structure of objects easily accessible to tool developers, but in addition is applicable to any environment for modifying a collection of connected objects of a variety of types.

SUMMARY OF THE INVENTION

The present invention provides a system and process for making use of pre-existing data-structures which represent a computer program, in a way which has the advantages of shortening the time and cost required to create a new version of the computer program. The pre-existing data-structure is modified to produce a shadow data-structure which contains shadows of only those elements or nodes of the pre-existing data-structure required to perform the tasks of the new version of the computer program. The present invention includes processes to make the data-structure of the original program shadowable; processes to use data from the original program compilation process in compiling the new version of the program, including processes to create a shadow data-structure; and processes to use the new version of the computer program along with the shadow data-structure to create the desired execution. This new version of the computer program is typically a tool for checking or observing the original program's execution in some manner. Moreover, the system and processes disclosed provide mechanisms for a software manufacturer to create type-safe versions of a connected collection of objects which are dynamically extensible.

A computer implemented method is disclosed in which a first data-structure is provided, and wherein a second data-structure is constructed by using a shadow-map which is operative to create and store a pair of pointers, this second data-structure being related to the first data-structure in some manner. Each element or node in the second data-structure is related to the first data-structure by using the pair of pointers in the shadow-map, wherein for each node in the second data-structure a first pointer of a pointer pair points to the node in the second data-structure and a second pointer of the pointer pair points to the corresponding node in the first data-structure. The method further includes using the second data-structure as an executable variation of the first data-structure. These data structures are collections of connected objects.

Also disclosed is a computer implemented method for creating a shadow-data-structure from an existing data-structure by converting the original program source code into code which will produce a shadowable intermediate data structure; creating a shadow node for each node of the shadowable data-structure; connecting the shadow nodes into a shadow data-structure and relating the nodes of the shadow data-structure to the original data structure by means of a shadow-map.

Also disclosed and claimed is a system using a computer for dynamically extending the use of a data-structure which consists of a first data-structure, a shadow-map which contains a pair of pointers, a second data-structure which is related to the first data-structure by means of the pointer pairs in the shadow-map, wherein a computer code device can use the second data-structure as an executable variation of the first data-structure:

Also disclosed and claimed is a computer mechanism for projecting a first data-structure of objects from one type space into another type space in a type-safe manner, which includes a first program code mechanism operative to convert an original source code into one which produces shadowable data-structures of objects; a shadow-map device to create a shadow data-structure of objects and to relate the shadowable data-structure of objects to a shadow data-structure of objects.

DESCRIPTION OF THE DRAWINGS

The objects, features and advantages of the system of the present invention will be apparent from the following description in which:

FIG. 19 illustrates a chart depicting exemplary implementation responsibilities for producing shadow data structures.

NOTATIONS AND NOMENCLATURE

Figure 1:
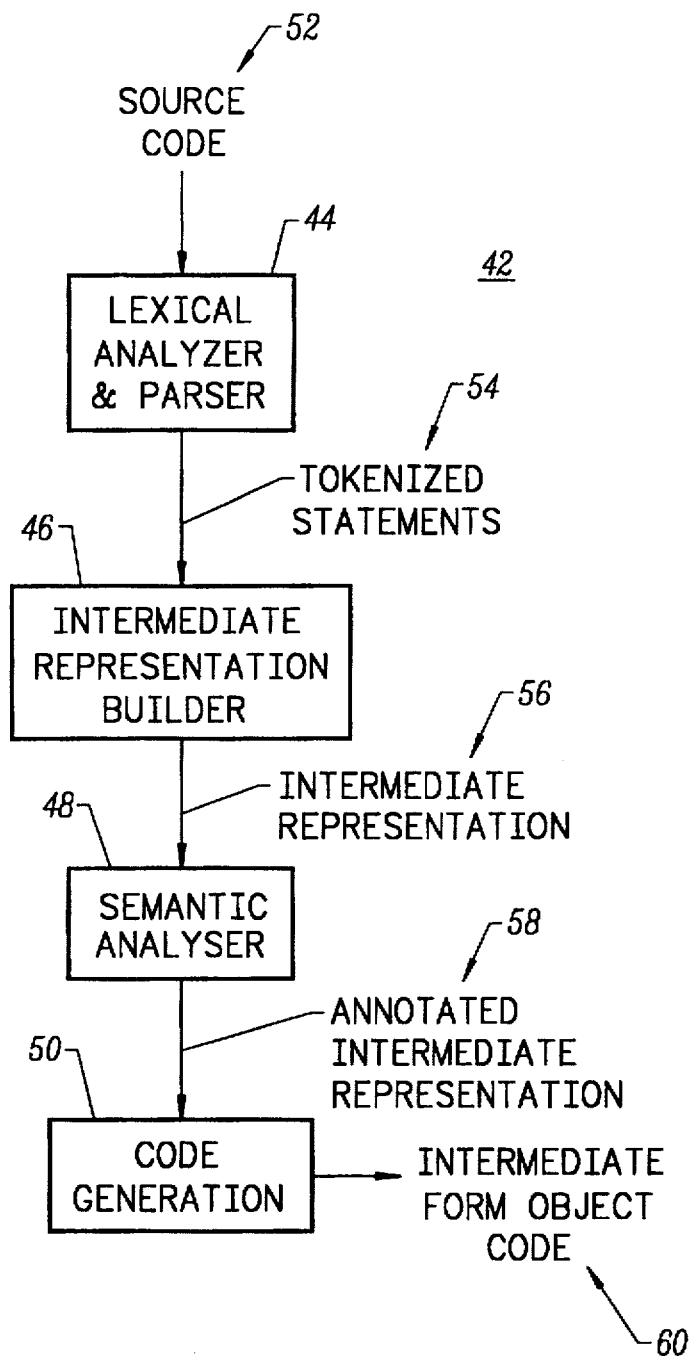
FIG. 1 illustrates an exemplary compiler.
Figure 2:
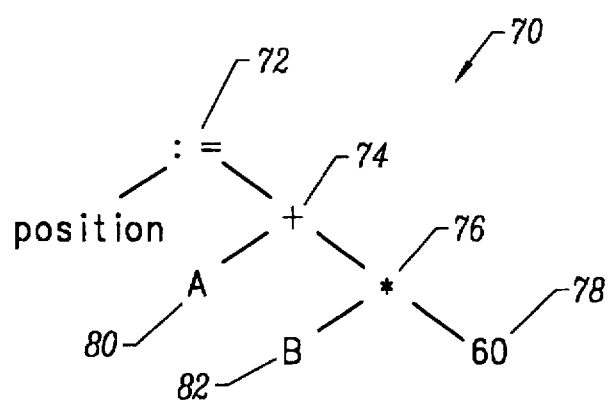
FIG. 2 illustrates an exemplary syntax tree.
Figure 3A:
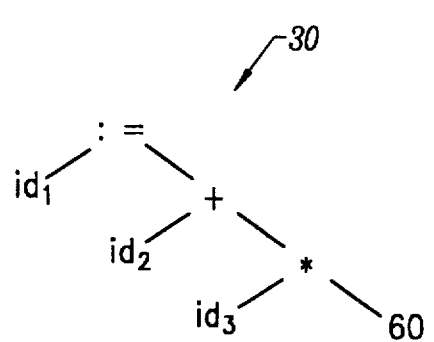
FIG. 3 illustrates a syntax tree (3a) and its corresponding data structure (3b).
Figure 3B:
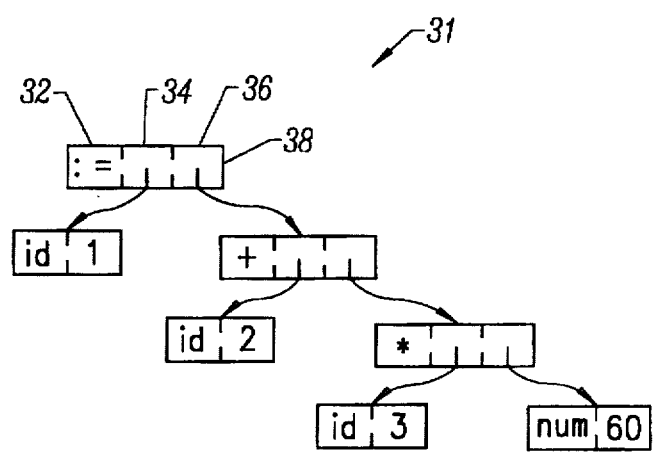

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or similar devices.

The present invention also relates to apparatus for performing these operations. This apparatus may be specially constructed for the required purposes or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

In an object-oriented program it is common to have a collection of interconnected objects, of a variety of types. To manipulate such a collection it is often desirable to be able to extend the functionality of the individual objects, in different ways for different and independent clients, and possibly for more than one client at a time. The complete set of potential clients may not be known when the code for the collection is compiled, or when the collection is actually built. Furthermore, it is desirable to be able to extend the functionality of the various objects in a type safe manner, that is, allowing an entity to refer to a sub-class but not allowing a sub-class to refer to a class.

'Shadowing' is a flexible way to solve this problem that permits a collection of objects to be projected from one type-space to another. Internally, a simple form of run-time typing is used to provide type-safety. In the preferred embodiment, both the shadow technology and the run-time typing technology use a specialized ShadowMap object to create shadow nodes of existing data structures and to maintain a mapping of the relationship of each shadow node to its corresponding node in the original data structure.

A process is disclosed which is a type-safe framework for dynamically extensible objects which is applicable to any environment for modifying a collection of connected objects of a variety of types, without having to inherit all of the methods of the original objects. The disclosed apparatus and process permits a user (such as a tool developer, for example) to create a shadow data-structure of an existing data-structure for subsequent execution, where both data-structures are connected collections of object-oriented programming objects. The implementation of the invention, while it may be used in any relevant context with any computer program product, is described in the context of a particular type of object-oriented compiler (that is, C++) and exemplary object-oriented programming systems for illustrative purposes. However, no specific knowledge of the illustrated system is required by those skilled in these arts to understand and implement the process and system described in this disclosure, using various other compilers and related tools.

Operating Environment

Figure 4:
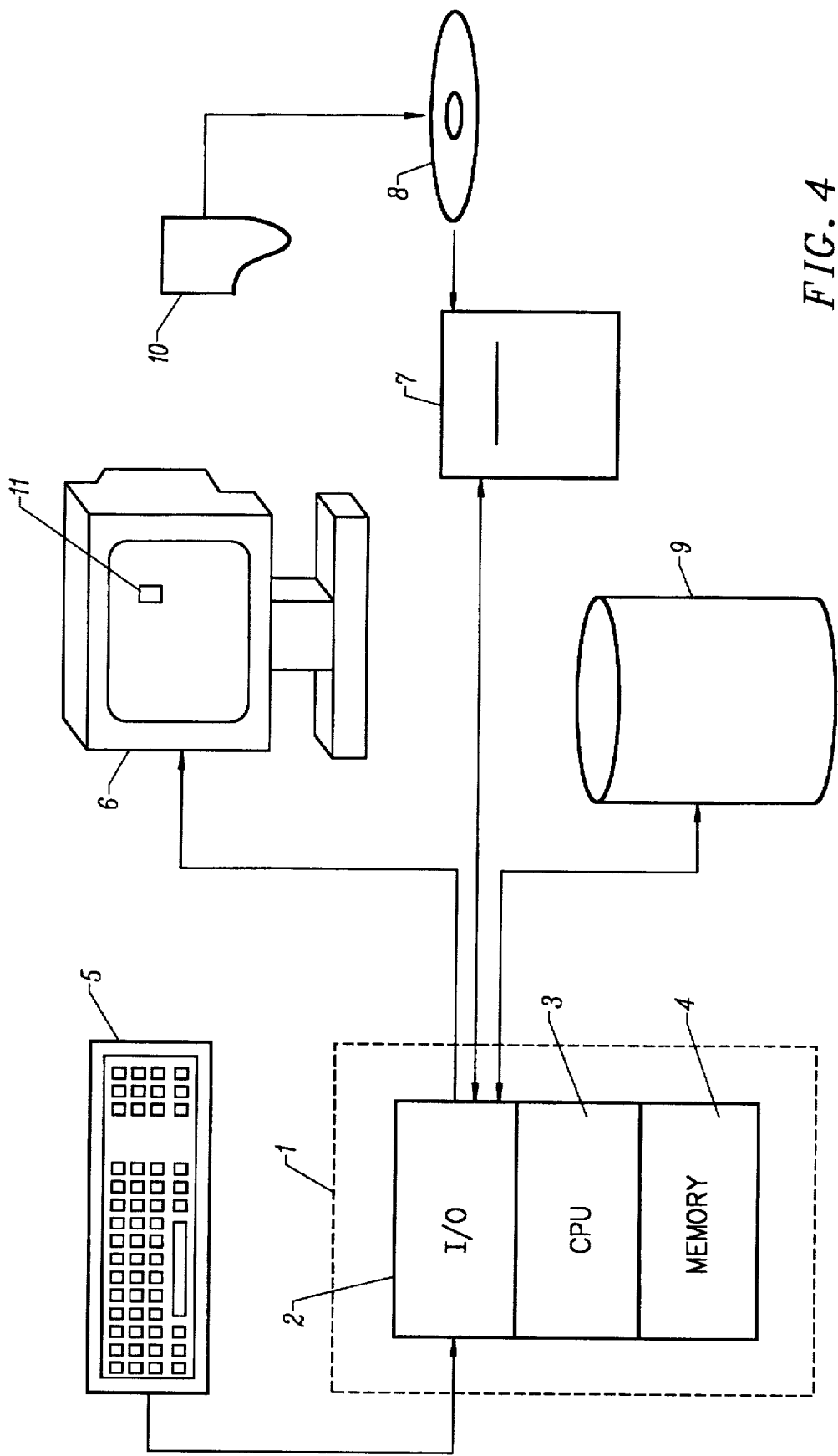
FIG. 4 illustrates an exemplary computer workstation.

The environment in which the present invention is used encompasses the general distributed computing system, wherein general purpose computers, workstations, or personal computers are connected via communication links of various types, in a client-server arrangement, wherein programs and data, many in the form of objects, are made available and shared by various members of the system for execution and access by other members of the system. Some of the elements of a general purpose workstation computer 20 are shown in FIG. 4, wherein a processor 1 is shown, having an Input/output ("I/O") section 2, a central processing unit ("CPU") 3 and a memory section 4. The I/O section 2 is connected to a keyboard 5, a display unit 6, a disk storage unit 9 and a CD-ROM drive unit 7. The CD-ROM unit 7 can read a CD-ROM medium 8 which typically contains programs 10 and data. A computer display icon 11 is shown on the display unit 6. Similar workstations may be connected by a communications path to form a distributed computer system.

The present invention will be discussed below in terms of basic background and underlying technology to provide a summary of how to build the invention and how it functions, followed by a detailed description of how to use the invention.

Underlying Technology
Shadows

Shadows are based on a mechanism which make it possible to project a data structure from one type space into another. The primary reason to do this is to add extra functionality to the nodes of the data structure, such as extra methods. More sophisticated use of the mechanisms may change the actual shape of the shadow type structure itself.

One particular feature of shadows is that they are designed to work well even when inheritance is used for the nodes of the data structures. Support is also provided for lazily evaluating the projection of the data structure.

Figure 5:
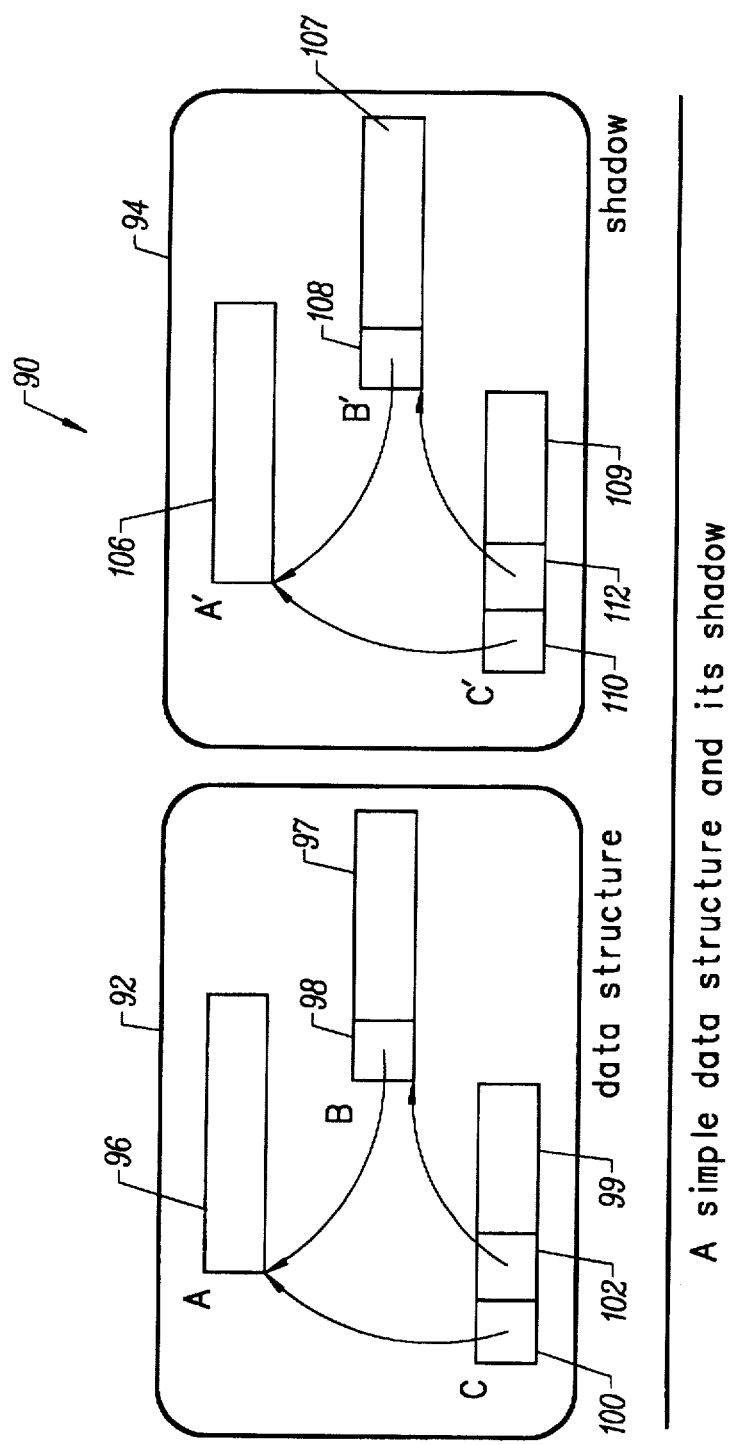
FIG. 5 illustrates a simple data structure and its shadow.

Referring now to FIG. 5, a simple data structure and its shadow are depicted 90. On the left is a simple data structure 92, involving nodes of type A 96, B 97, and C 99. On the right is the shadow data structure 94, in which the nodes are of type A' 106, B' 107, and C' 109. The shadow may perhaps have been created in order to extend the types of the nodes in the data structure, and because it was not possible to change the data structure itself. In FIG. 5, node A 96, is connected to node B 97, by the pointer 98, and node C 99 is connected to nodes A 96, and B 97, by pointers 100 and 102 respectively. The corresponding nodes in the shadow data structure 94 are similarly connected by pointers 108, 110 and 112.

In FIG. 5, there is a 1—1 correspondence between the instances of the nodes in the data structure and its shadow, and there is a 1—1 correspondence between the types of the nodes in the data structure and the types of the nodes in its shadow. As will be indicated, neither of these conditions are required.

Note also the convention that is used throughout this disclosure: that T' stands for the type of the shadow of a node of type T.

The Shadow Map

In the preferred embodiment, the shadow data-structure illustrated in FIG. 5 is created by an object, which again in the preferred embodiment is called a ShadowMap object. Those skilled in the art will recognize that there are numerous ways to perform these same create functions.

The ShadowMap object provides a lazily evaluated mapping from the nodes in the original data structure to the corresponding nodes in the shadow data structure. Lazy evaluation means that if no one ever asks for a particular node to be shadowed the shadow node will never be created. Entries in the mapping are generated on demand by calling upon methods to fabricate nodes in the shadow data structure. These methods are called the factory methods of the map. Factory methods are supplied by a client that wishes to create a shadow structure.

Figure 6:
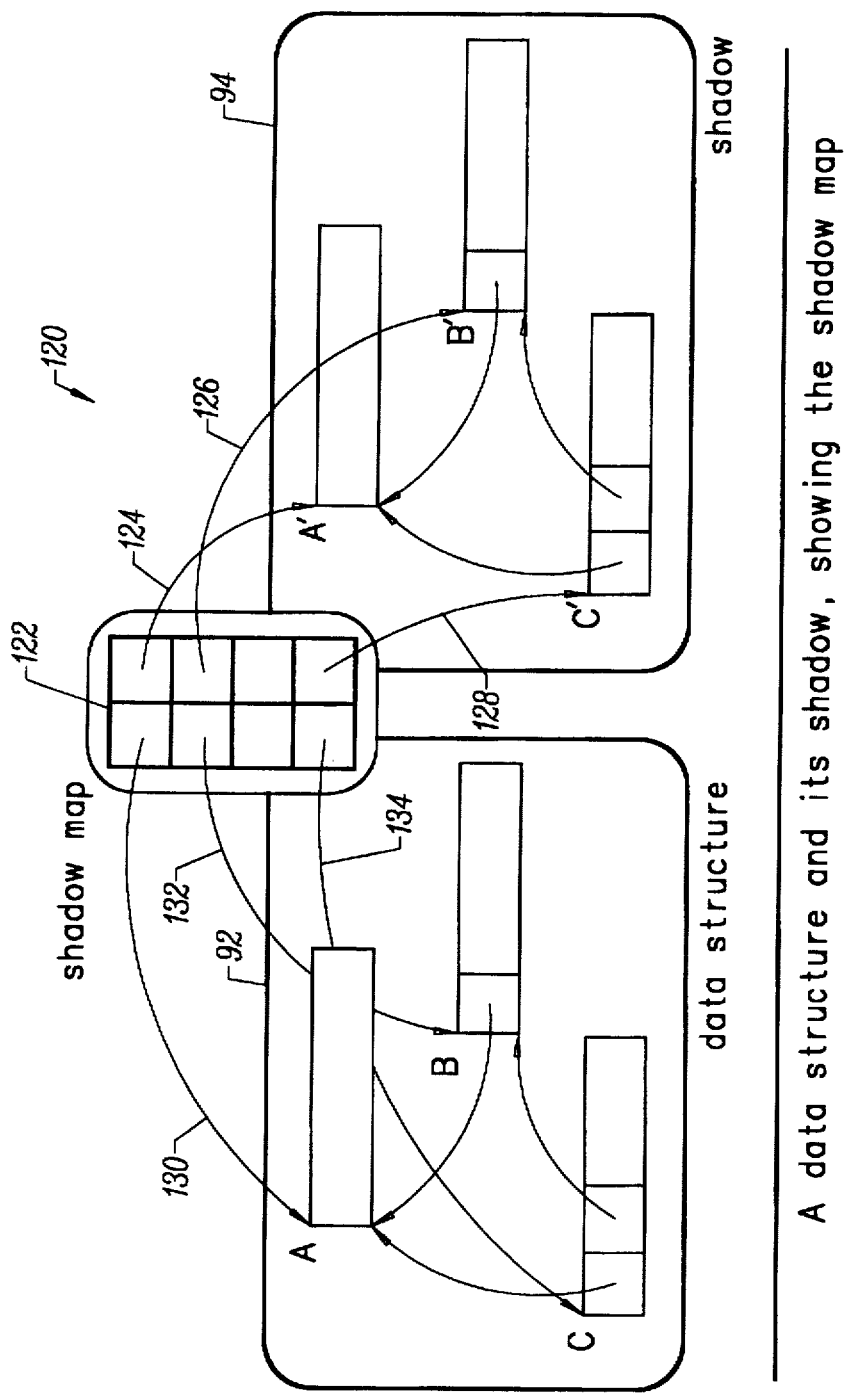
FIG. 6 illustrates a simple data structure and its shadow, showing the shadow map.

Referring now to FIG. 6, a data structure 92 and its shadow data structure 94, as illustrated in FIG. 5 are depicted again, but this time a shadow map 122, which is used in the creation of the shadow data structure 94, is also illustrated. The shadow map 122 is created by the ShadowMap object and includes the pointer pairs 124, 130; 126, 132 and 128, 134 which are retained in the shadow map 122, and which relate each node in the original data structure 92 to its corresponding shadow node in the shadow data structure 94.

Thus, to get the shadow of a node, it is sufficient to ask the ShadowMap object for the shadow, passing it the node in question. Internally, the ShadowMap object sees if it already contains the shadow node for the requested node, by checking the shadow map 122. If it does, that value is immediately returned; if not, it calls a factory method to create the shadow node. The result that is returned from the factory method is both remembered by the ShadowMap object for future reference (by storing a pointer in the shadow map 122) and also returned to the caller.

Once a shadow data structure has been created, the shadow map 122 often plays no further role and might even be deleted. Alternatively, it does contain pointers to all the nodes in the shadow data structure, and so can prove helpful in performing operations involving the complete set of shadow nodes, such as deleting them when they are no longer needed. Those skilled in the art will realize that the shadow data structure and shadow map may be used for any number of alternative applications.

Manipulating the data structure

In the examples above, an unwritten implication of the figures is that the nodes of the shadow data structure are very similar to the nodes in the original, merely having the types projected into the shadow type space. However, there is no reason for this to be so; the methods on the ShadowMap object that generate shadow nodes can generate whatever form of shadow nodes they choose. The only restriction placed on these methods is that for each node in the original data structure, there should be a single corresponding node in the shadow data structure. However, a node in the original data structure can have no corresponding shadow node, in which case the shadow map will contain a null pointer in the appropriate entry.

Figure 7:
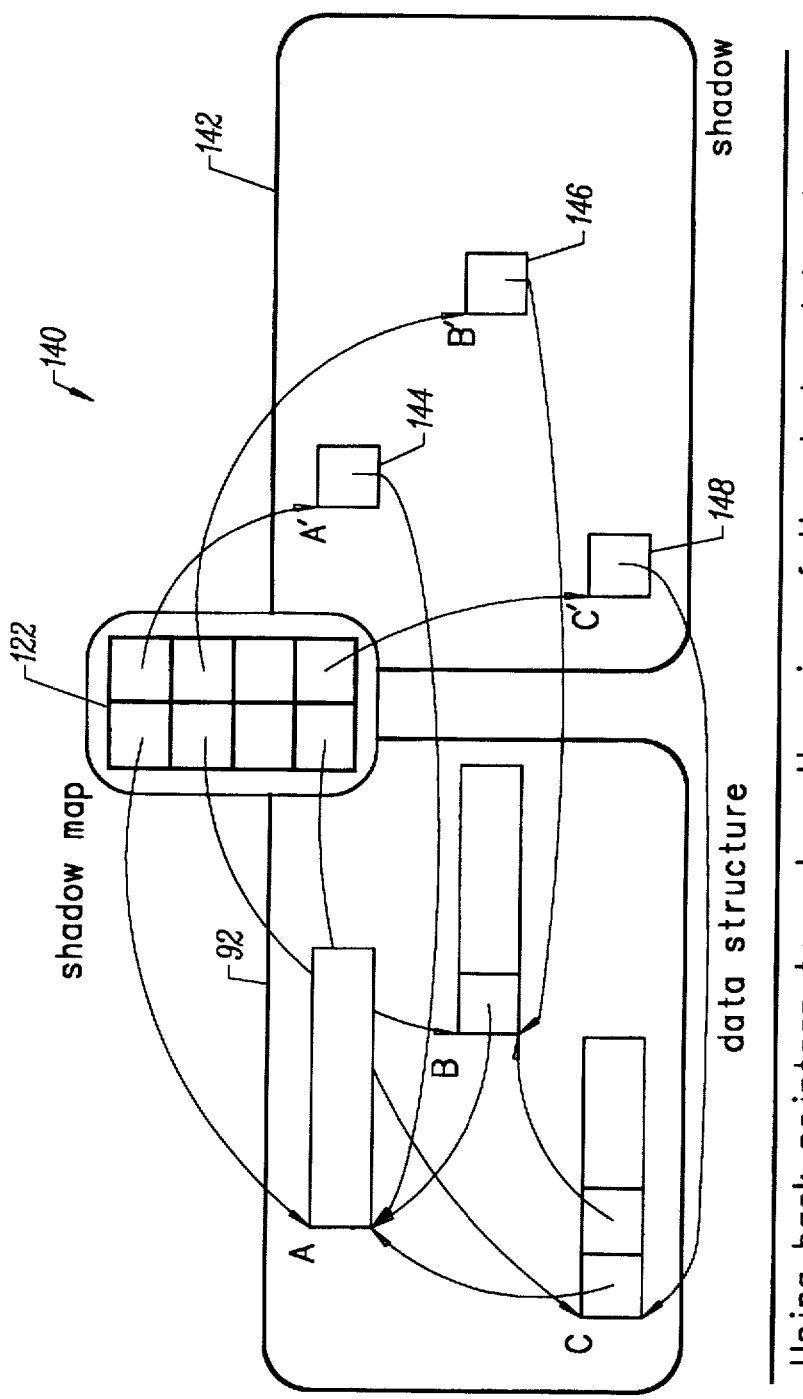
FIG. 7 illustrates using back pointers to reduce the size of the shadow data structure.

For example, suppose that we are merely creating the shadow in order to add a method to each of the nodes, such as a "print" method. In this case, the shadow data structure might choose merely to store back pointers to the nodes in the original data structure, without shadowing the relationship between the nodes in the shadow space at all. The print method can get at the instance data to be printed by following the back pointer to the nodes being shadowed; if needed, each shadow node can get at its shadow children by re-evaluating the shadows of the children in the original data structure on demand. This type of shadow data structure is illustrated in FIG. 7, wherein the original data structure 92 is shown, and the shadow map 122, but a new shadow data structure 142 is shown containing only nodes 144, 146 and 148 which are back pointers to the corresponding nodes of the original data structure 92.

As well as specifying the instance data for the shadow nodes, the factory methods may also change the type of the nodes on a per-instance basis. Thus two nodes in the original data structure may be represented by the same type, albeit with different instance data. In shadowing these two nodes, a factory method may examine the instance data and choose between two different representations for the shadowed node.

For example, in the case where the data structure being shadowed is a parse tree generated by a compiler front end the following could obtain. A binary expression node in the parse tree might be represented by a single node type, PT_BinaryExpr, with an enumerated value indicating the operation of the expression: add, subtract, multiply or divide. However, a compiler back end may choose to shadow this one type of node by generating different types of shadow nodes depending on the operation involved, such as CG_AddExpr, CG_SubExpr, CG_MultExpr, or CGDivExpr.

It may also be the case that not all of a data structure needs to be shadowed. Consider again the case of the parse tree generated by a compiler front end. An incremental code-generator may only need to generate code for (and hence shadow) the parse tree for one or two methods and not the whole tree. Those skilled in these arts will recognize that the present invention may be used to generate any number of kinds of shadow data structures for various situations.

Cyclic and acyclic data structures

In order to shadow a node, the preferred embodiment described so far says that a client should simply ask the ShadowMap object for the shadow, and that the ShadowMap object will compute it if necessary by calling the appropriate factory method. However, if invoked, that method will often call upon the ShadowMap object for the shadows of child nodes of the original, and this may in turn recursively invoke the factory method. All will be well, provided the data structure being shadowed is acyclic.

Figure 8:
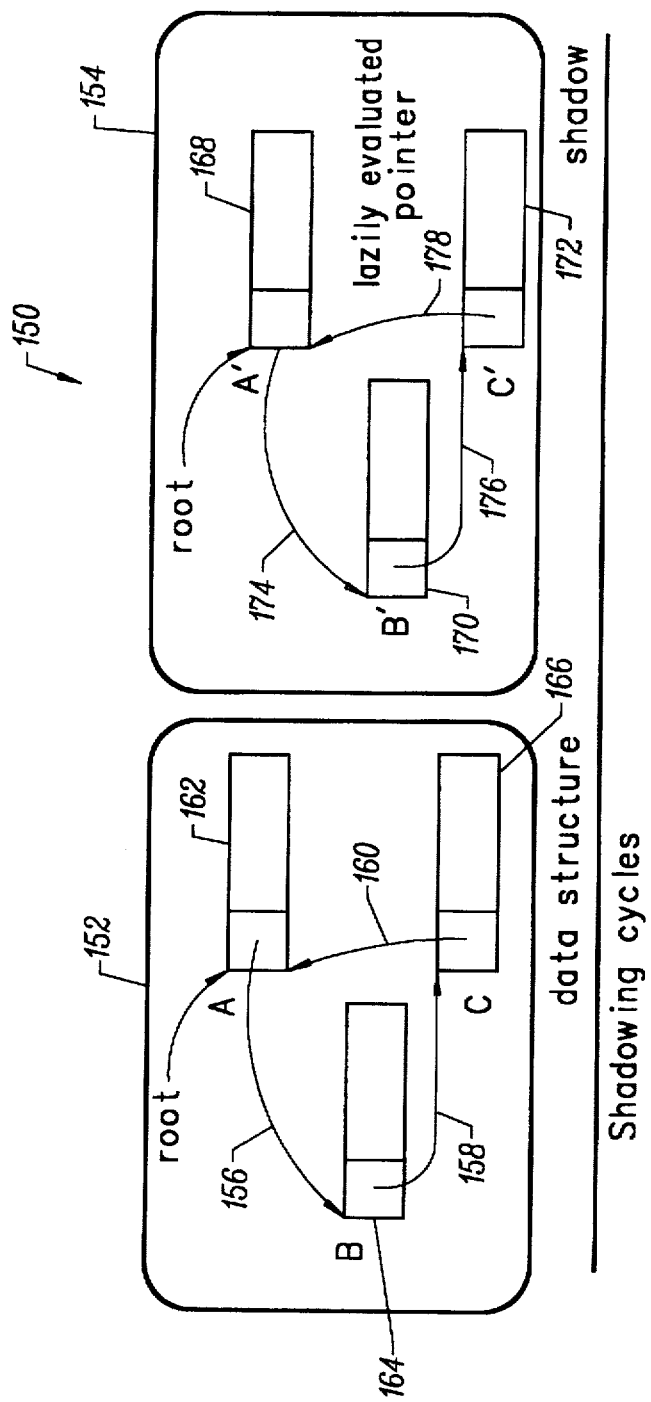
FIG. 8 illustrates shadowing cycles.

In the preferred embodiment, if the data structure contains cycles, slightly more care must be taken. Specifically, the (possibility of a) cycle must be known and the cycle explicitly broken. Referring now to FIG. 8, a data structure 152 containing a cycle structure is shown. That is, node A 162 is connected to node B 164 which is connected to node C 166, which is connected to node A 162. In creating the shadow data structure 154, in the course of shadowing A 162, B 164 needs to be shadowed, which needs C 166 to be shadowed, which potentially needs A 162 to be shadowed-and which may not have been completed yet, and so will not be available in the shadow map. Instead, the shadow node C' 172, created by the ShadowMap object, stores a lazy pointer 178 to shadow node A' 168 which is only dereferenced to a real pointer when absolutely necessary. In particular, it can only be dereferenced after the shadowing of A 162 has been completed, in which case the ShadowMap object can provide the information that the result of shadowing A 162 is A' 168. Once it has been converted to a real pointer, that value is remembered so that future accesses will be almost as fast as using the pointer itself.

In the C++ implementation of the preferred embodiment, it serves to use a special type of pointer some where within the cycle, which is lazily evaluated. This is described in detail below in the section describing, "Lazy shadows for cyclic data."

How to Make and Use the Invention.

C++ Implementation in the Preferred Embodiment

In the preferred embodiment of the present invention, implementing a shadow map by calling upon a factory object and caching the results in a hash table becomes complicated when inheritance is taken into account, and when constrained by the rules and idiosyncrasies of the C++ type system.

Inheritance

Figure 9:
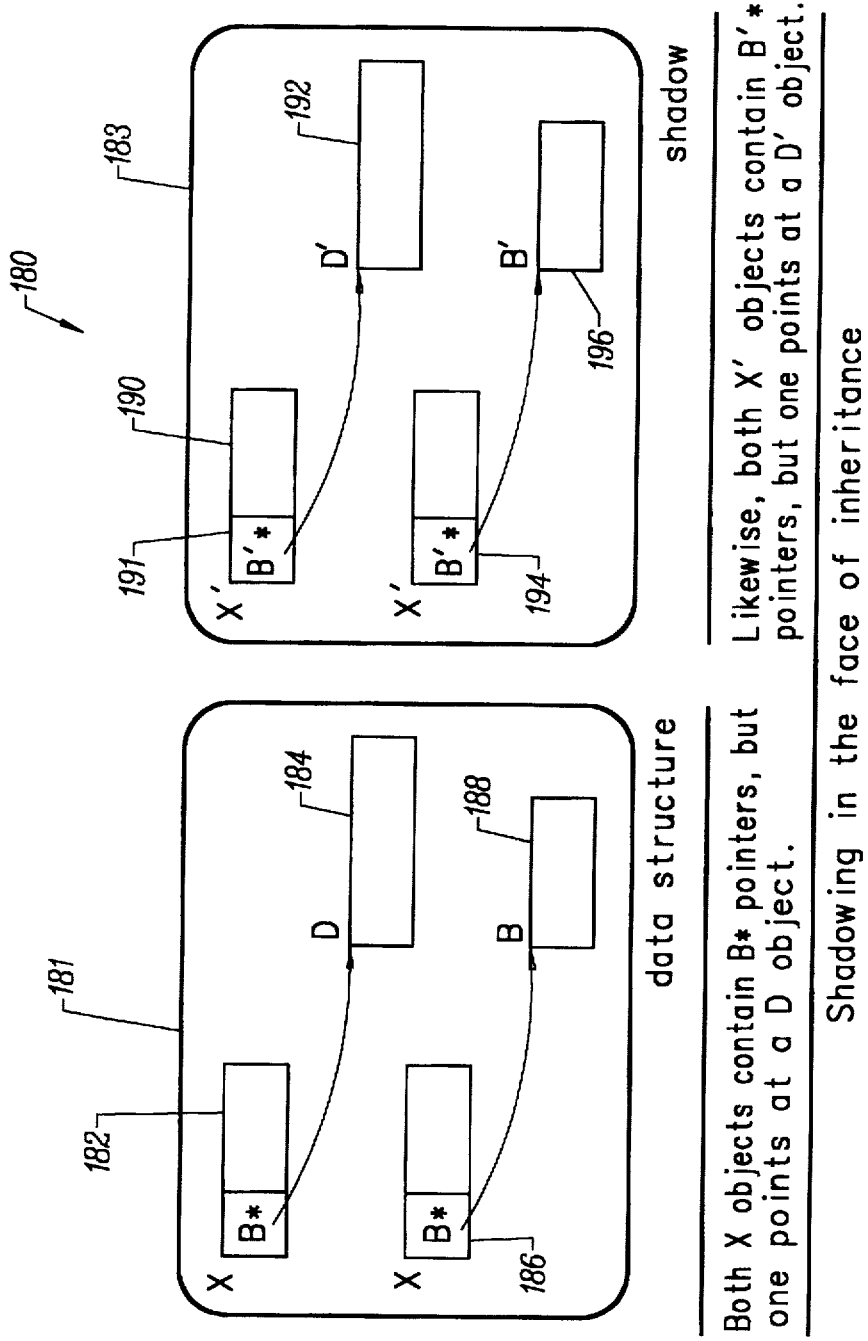
FIG. 9 illustrates shadowing in the face of inheritance.

Referring now to FIG. 9, a data structure 181 and its shadow data structure 183 illustrate shadowing in the face of inheritance. In the data structure 181, consider two classes, B and D, such that B is a base class and D is derived from B. Now consider another class, X, which contains a pointer of declared type B*182. When that pointer is initialized, it could be initialized with a pointer to an object of class B 188, or it could be initialized with a pointer to an object of class D 184, with the pointer being widened from type D to type B*.

Now consider the shadow type space 183. Suppose B' 196 is the shadow type for B 188, D' 192 is the shadow node for D 184 and node X' 190, 194 for X 182,186. Then, in a simple shadow mapping, node X' 190 will contain a pointer of type B'*191, and that pointer may point to objects of type B' 196, or D' 192 if the pointer has been widened.

The problem, then, is to correctly shadow not only the dynamic (or 'true') type of the objects, but also the static (or 'perceived') type.

Shadowable, ShadowMap and T'::shadow.

Figure 10:
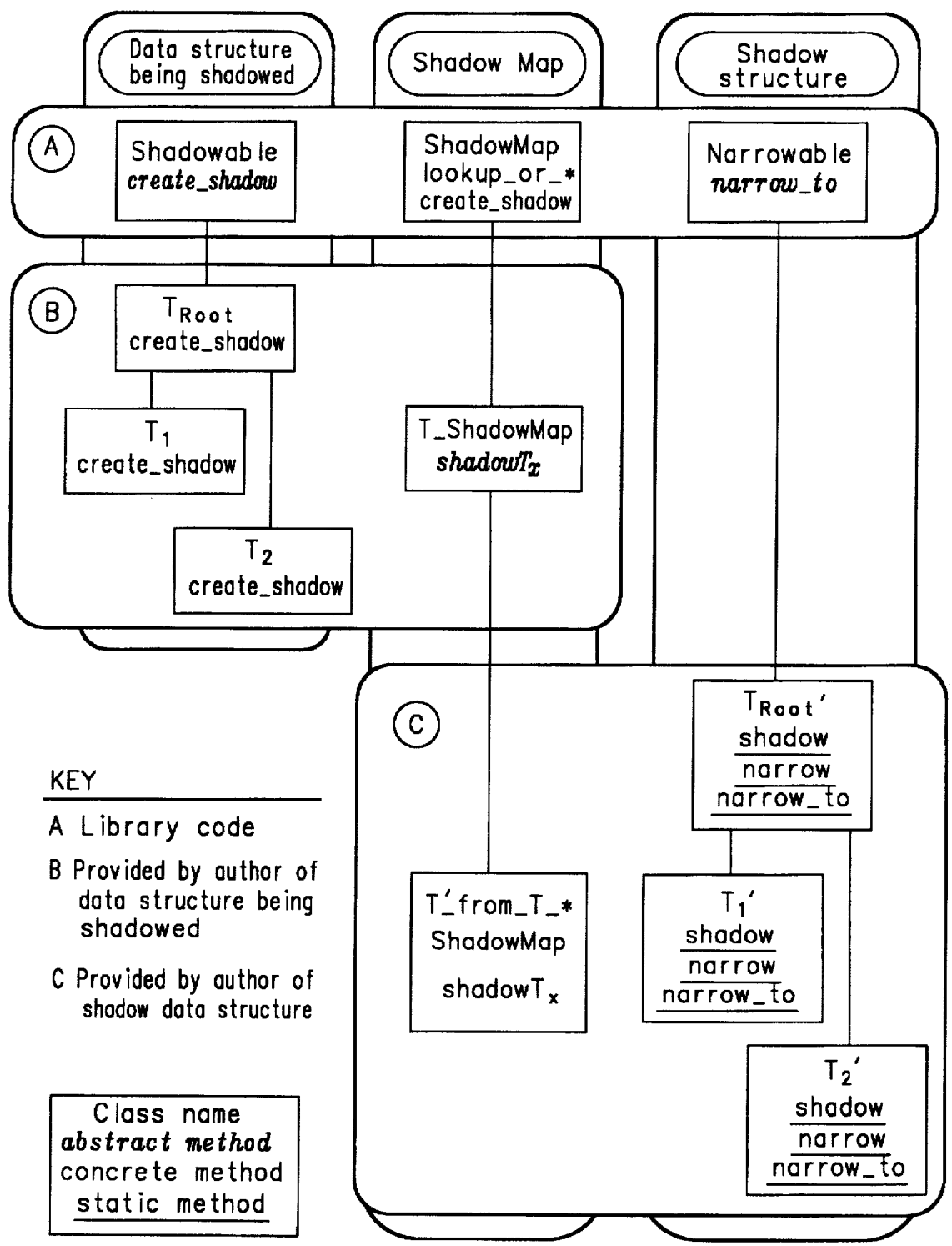
FIG. 10 illustrates primary classes and methods used to implement shadows.

In the preferred embodiment, a number of classes and methods collaborate to provide the shadowing mechanism. FIG. 10 outlines the classes and primary methods involved.

Shadowable

Nodes to be shadowed must inherit from Shadowable. This provides an important virtual method that is used during the process of instantiating the shadow of a node.

```
class Shadowable
{
public:
    virtual Narrowable *create_shadow (ShadowMap *map) =0;
};
```

Although all nodes to be shadowed must provide an implementation of create_shadow, this method is never directly called by a client. In the preferred embodiment, the implementation is boiler-plate code that invokes the appropriate factory method on an appropriate subtype of the shadow map argument. This boiler-plate code can be mechanically generated by the program "autodefine". The map argument provides a context for the shadow, permitting different shadows of the same node to coexist.

ShadowMap

In the preferred embodiment, the object ShadowMap represents the shadow map. It has one public method, to look up a shadow node in the map, and to create one if not found. However, even this method is not normally called directly by clients. Instead, clients should call the shadow method on the target class instead, which provides more convenient and type-safe access to shadow nodes.

There will normally be two levels of inheritance based on ShadowMap. The first extends the ShadowMap with a set of pure virtual methods that define the ability to shadow specific types of nodes; the second level provides the implementation of those pure virtual methods.

```
class ShadowMap
{
public:
    Narrowable *lookup_or_create_shadow(Shadowable *orig);
    // returns the shadow node for 'orig'.
};
```

T'::shadow

The most important method in the preferred embodiment is T'::shadow, since it is the primary way a client creates or accesses the shadow of a node. It is a static method on the desired type, T', of the shadow node. It takes two arguments: the node to be shadowed, of type T, and a shadow map.

static T' *T'::shadow(T *t, ShadowMap *map);

It returns the shadow of "t" according to "map." The argument passed as "map" should be an instance of a map capable of generating T' nodes from T nodes. This can be enforced by using an appropriate subtype of ShadowMap, as described below.

Making a data structure shadowable

Figure 11:
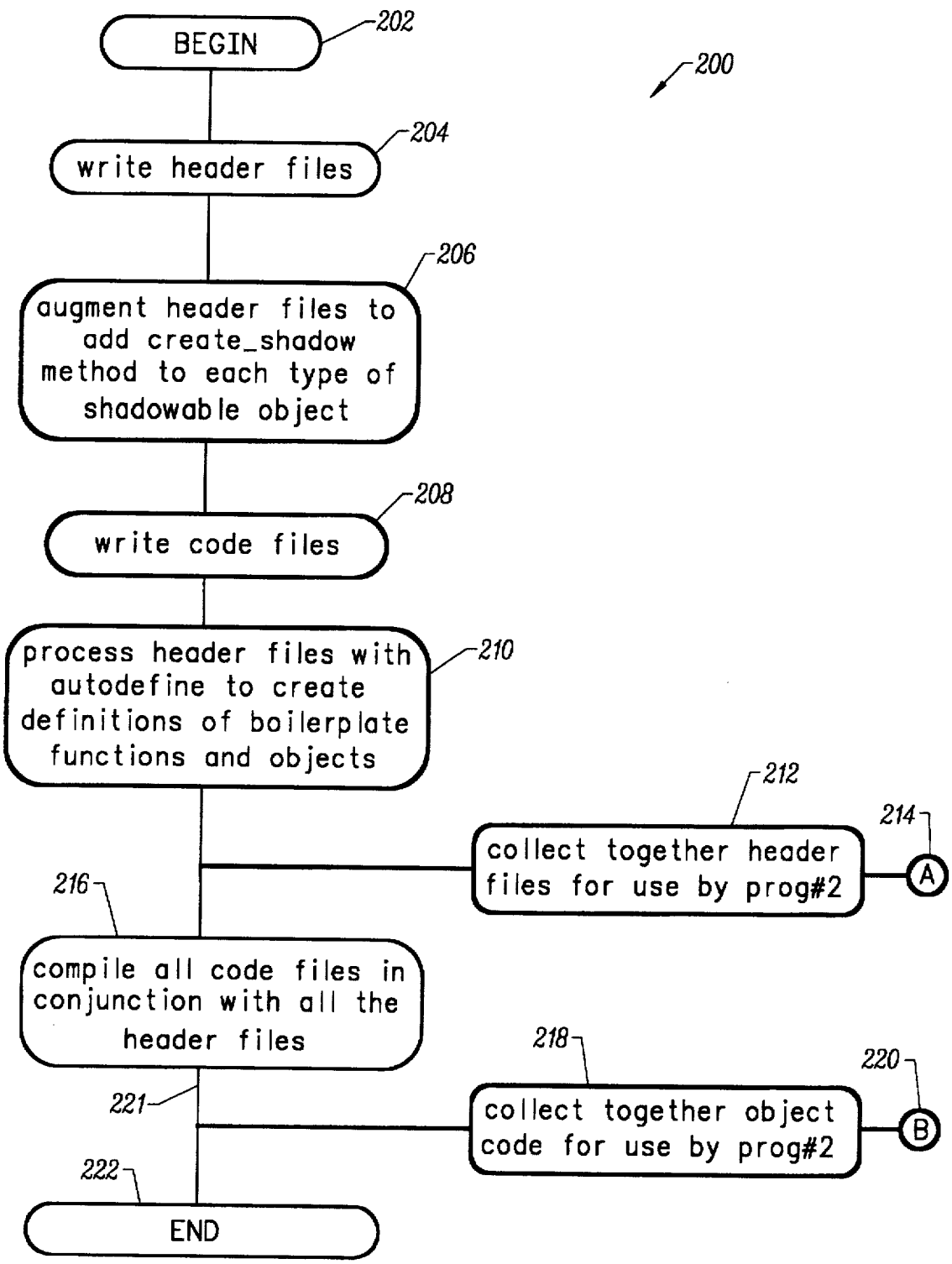
FIG. 11 illustrates a task flow diagram for a first programmer.

The steps that must be taken to make a data structure shadowable in the preferred embodiment are now described. Referring now to FIG. 11, a task flow diagram 200 for the programmer of the original data structure is illustrated. In FIG. 11 the process begins with the programmer writing header files 204 to describe the objects that go to make up the data structure. These header files are augmented to add "create_shadow" method to each type of shadowable object 206. The objects declared in the header files will inherit from the library class "Shadowable". Since the data structure is composed of objects, and objects have methods, the programmer then writes the code 208 for the methods of the objects in the data structure. In the preferred embodiment, some of the methods can be mechanically generated by running the header files through the program "autodefine" to create definitions and boiler plate functions and objects 210. The output of "autodefine" is C++ code that is combined with the written code from step 208. The programmer must also provide a special "ShadowMap" object for others who may wish to shadow the data structure. The "ShadowMap" class is also generated by "autodefine" in step 210 resulting in some header files that are combined with the header files from step 204 and all of these header files are collected together for later use by others 212. All of the header files and code files are then processed by a compiler 216 to generate object code. The output from the compiler 221 will be used by both the originating programmer and by others who may wish to create shadow data structures therefrom 218.

In the preferred embodiment, some additional comments are of interest. To make a data structure shadowable, all the nodes to be shadowed in the data structure must inherit from a common root class, and this common root class must itself inherit from "Shadowable." The need for a common root class other than "Shadowable" is a requirement of the program "autodefine" which is used to automatically generate parts of the shadow machinery.

All nodes to be shadowed must implement the abstract "create_shadow" method inherited from "Shadowable."

Narrowable *create_shadow (ShadowMap *);

These implementations of "create_shadow" are typically declared as private methods on the nodes to be shadowed, to emphasize that they are not to be called directly by clients. (The method is declared public on "Shadowable.") The implementation is boiler-plate code that invokes the appropriate factory method on an appropriate subtype of the shadow map argument. This boiler-plate code can be mechanically generated by the utility "autodefine".

One more thing must be done to make a data structure shadowable: an abstract subtype of "ShadowMap" must be provided that defines a special method for each node type, T, to be shadowed:

Narrowable *shadowT(T*);

These methods will be referred to in the boiler-plate implementations of "create_shadow."

Example

Figure 12:
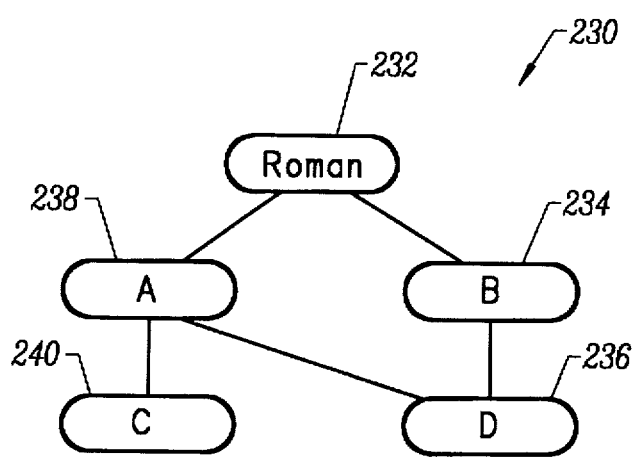
FIG. 12 illustrates a class structure for an example data structure.

Referring now to FIG. 12, a class structure for an example data structure 230 is shown. The data structure containing nodes of type A 238, B 234, C 240 and D 236. Suppose C 240 inherits from A 238 and D 236 inherits from both A 238, and B 234. Let us suppose that "Roman" 232 is the super-type for these four classes.

Then we would expect to see the following patterns in the code:

```
class Roman: public virtual Shadowable
{
public:
    // any generic methods on all Roman node types can be declared here
private:
    Narrowable *create_shadow (ShadowMap *);
};
class A: public virtual Roman
{
public:
    // A methods...
private:
    Narrowable *create_shadow (ShadowMap *);
};
class B: public virtual Roman
{
public:
```

-continued

```
    // B methods...
private:
    Narrowable *create_shadow (ShadowMap *);
};
class C: public virtual B
{
public:
    // C methods...
private:
    Narrowable *create_shadow (ShadowMap *);
};
class D: public virtual A, public virtual B
{
public:
    // D methods...
private:
    Narrowable *create_shadow (ShadowMap *);
};
class Roman_ShadowMap: public virtual ShadowMap
{
public:
    virtual Narrowable *shadowRoman(Roman *);
    virtual Narrowable *shadowA(A *);
    virtual Narrowable *shadowB(B *);
    virtual Narrowable *shadowC(C *);
    virtual Narrowable *shadowD(D *);
};
```

Given the name of the root class, "Roman", the utility "autodefine" can mechanically generate the definition of the class "Roman_ShadowMap" and default method bodies. The details of the default "shadow T" methods are described below. Those skilled in these arts will recognize that "virtual inheritance" is used in this example as a matter of style, and it may not be necessary in all situations.

Making a specific shadow of a data structure

For any data structure to be shadowed, it must be built with the conventions described above.

To permit a specific shadow to be made, the major task is to provide an implementation of -the subtype of "Shadow-Map" specific to the nodes in the data structure.

The shadow map subtype contains a collection of methods of the form:

Narrowable *shadowT(T*);

These methods will be implicitly invoked as a result of a client calling T'::shadow (t, map); for the first time. (Subsequent calls will return the same result, which will have been saved in the shadow map.) Thus it is the task of the method to construct a T' object from the T*argument. This will typically involve shadowing the members of the T object and constructing a T' object from them.

In addition to providing an implementation of a shadow map with factory methods that actually create the nodes of the shadow data structure, a shadow method must be declared on each of the classes for nodes in the shadow data structure. More accurately, it must be declared on those classes which can be generated as the result of shadowing a shadowable node. (See T'::shadow discussion above.)

If the class being shadowed is T, and the corresponding shadow class is T', then the shadow method is declared as:

```
class T'
{
public:
    static T' *shadow(T *t) TRoot_ShadowMap *map);
};
```

In the preferred embodiment, the implementation of this method is boiler-plate, and can be generated by the utility "autodefine". It calls map->lookup_or_create_shadow (t)

and narrows the result to be of type T*. "Narrows" here refers to a C++ technology which is described in Appendix A. Narrowing is also known as "down-casting" in the C++ community.

Figure 13:
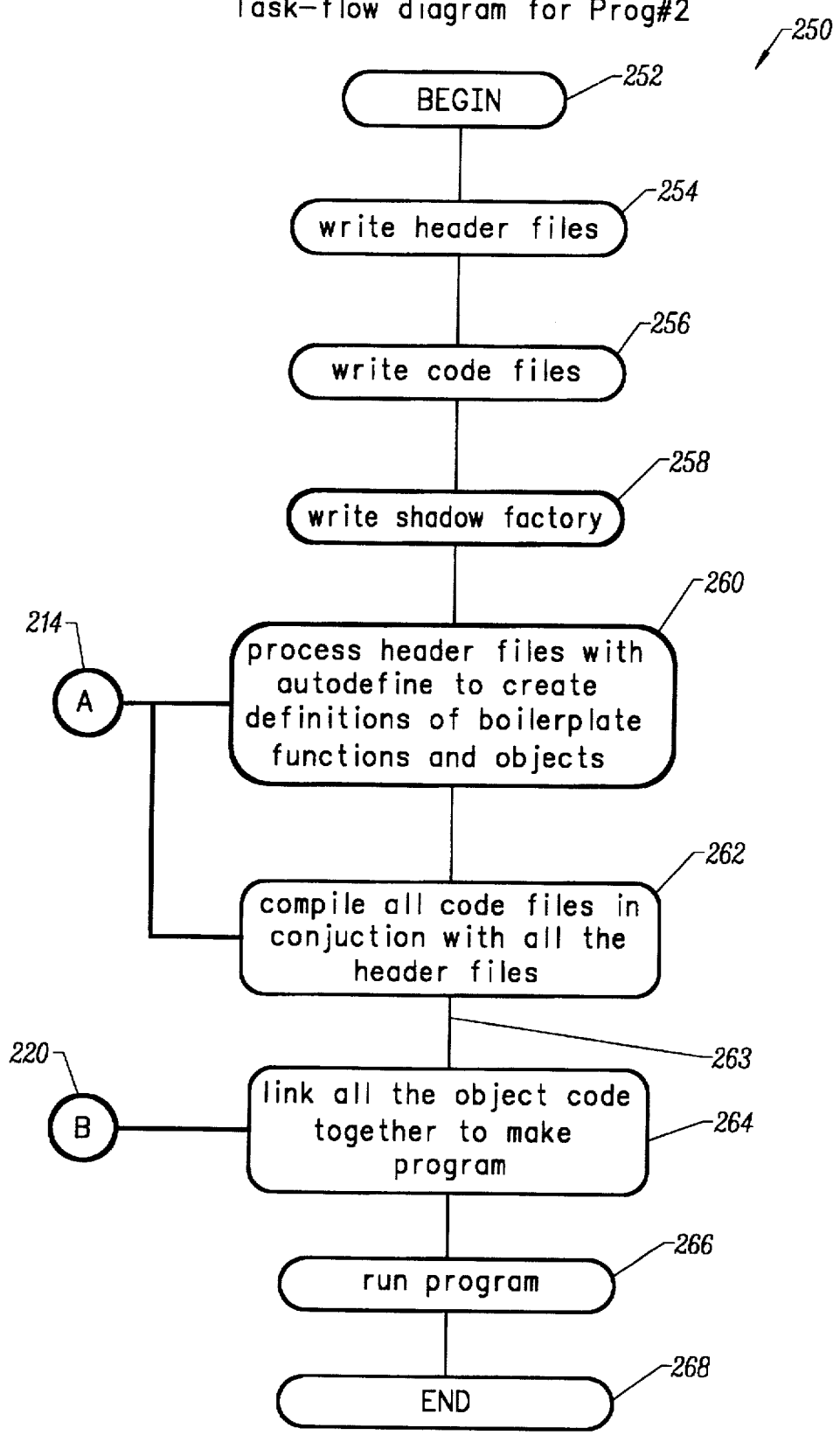
FIG. 13 illustrates a task flow diagram for a second programmer.
Figure 14:
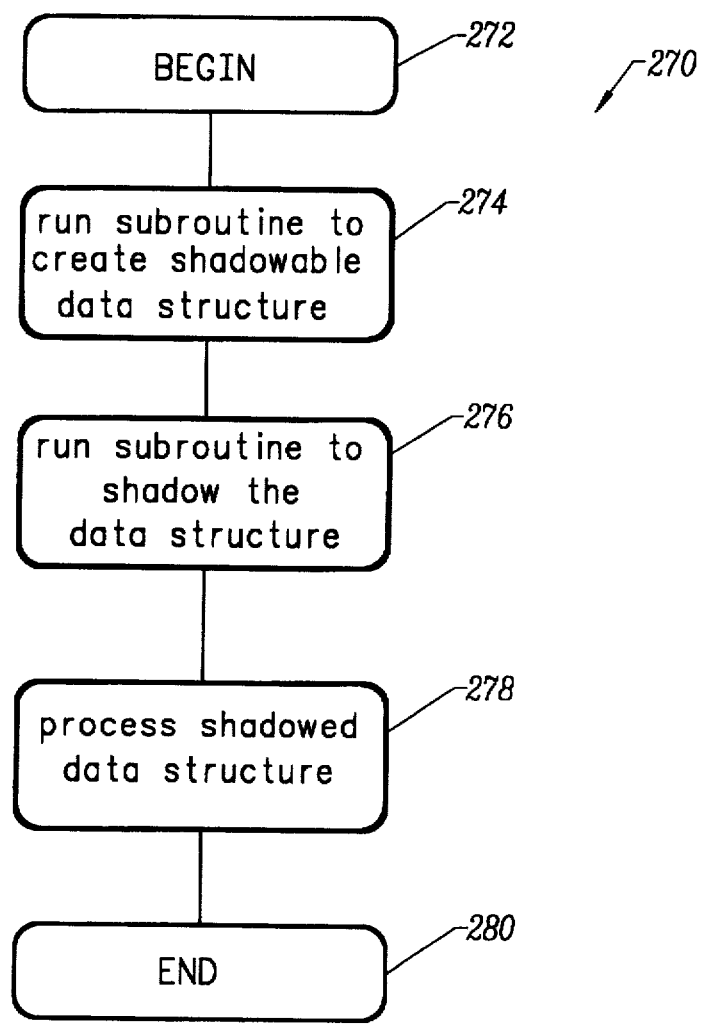
FIG. 14 illustrates a task flow diagram for a program written by the combined efforts of the first and second programmers.
Figure 15:
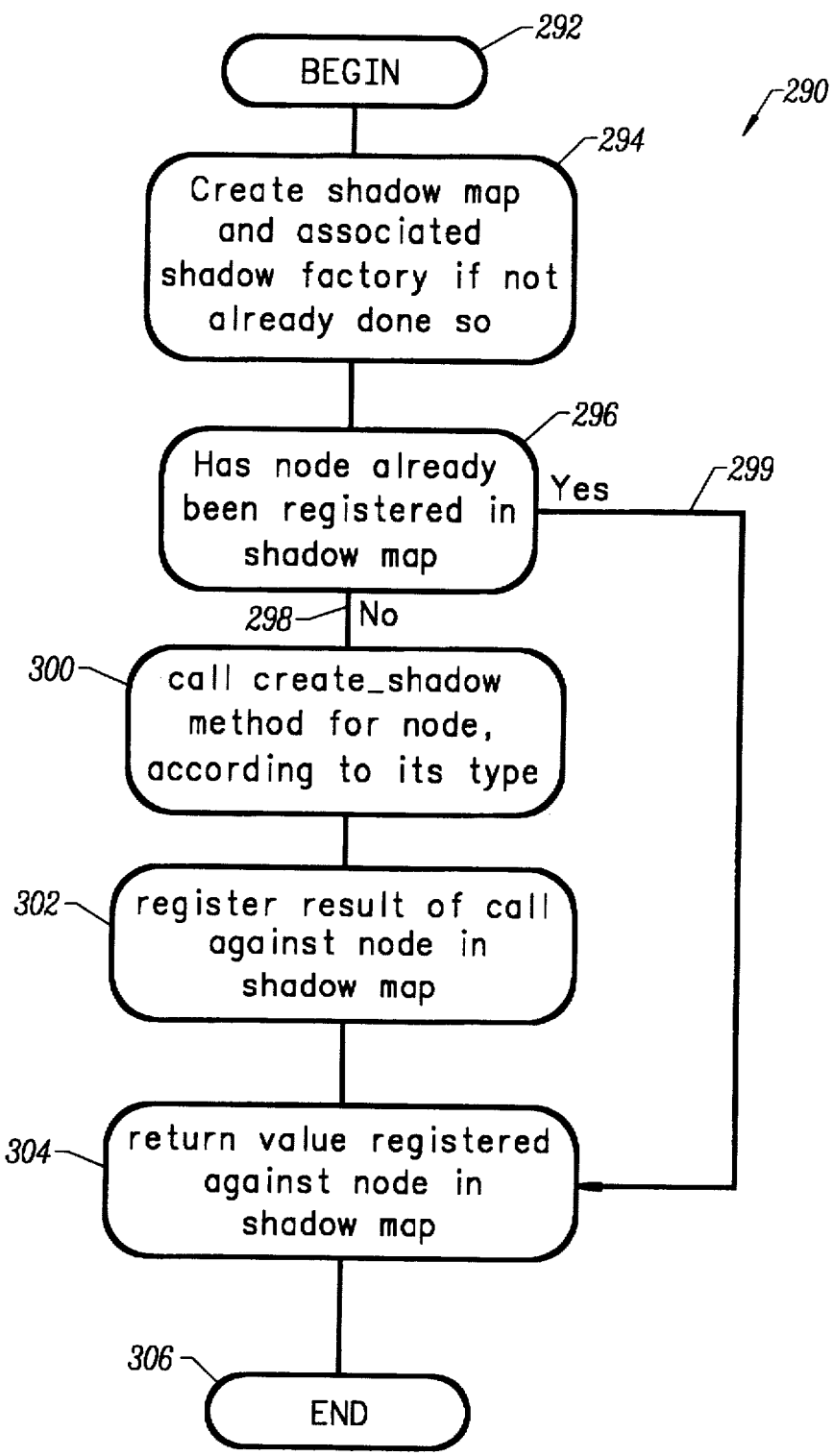
FIG. 15 illustrates a flow chart for a subroutine to shadow any node of a shadowable data structure.
Figure 16:
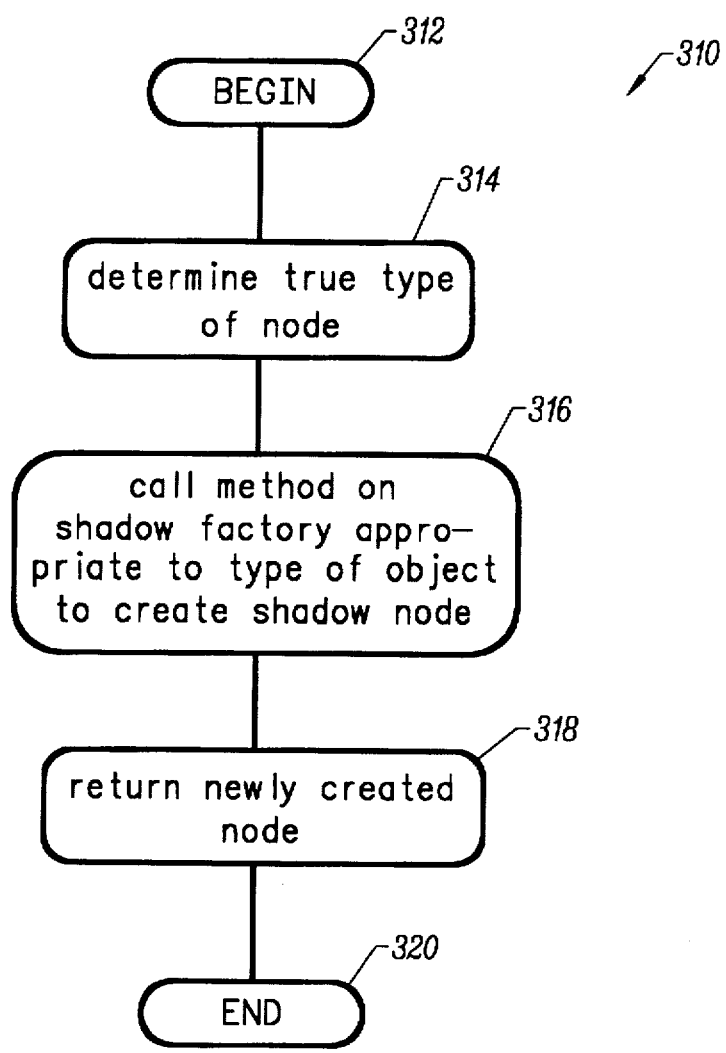
FIG. 16 illustrates a flow chart for a create_shadow method for a node.
Figure 17:
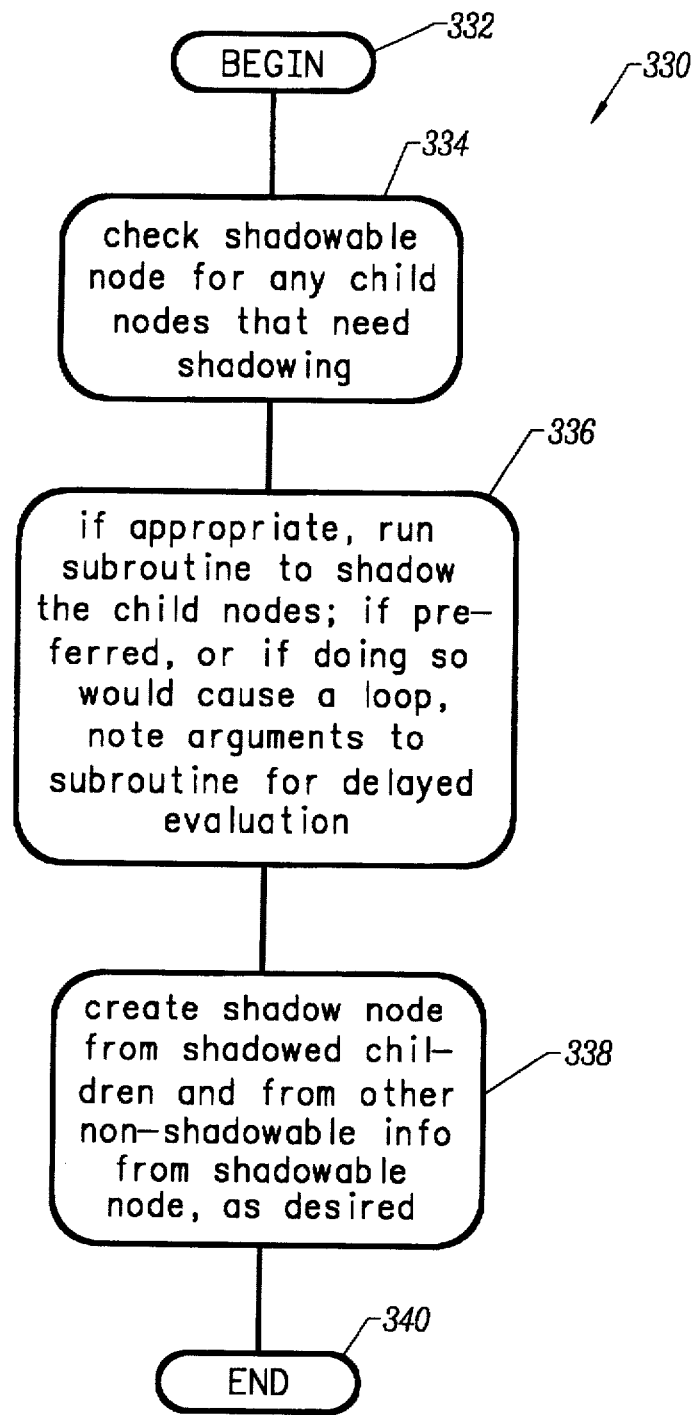
FIG. 17 illustrates an exemplary method for a shadow factory to create a shadow node.
Figure 18:
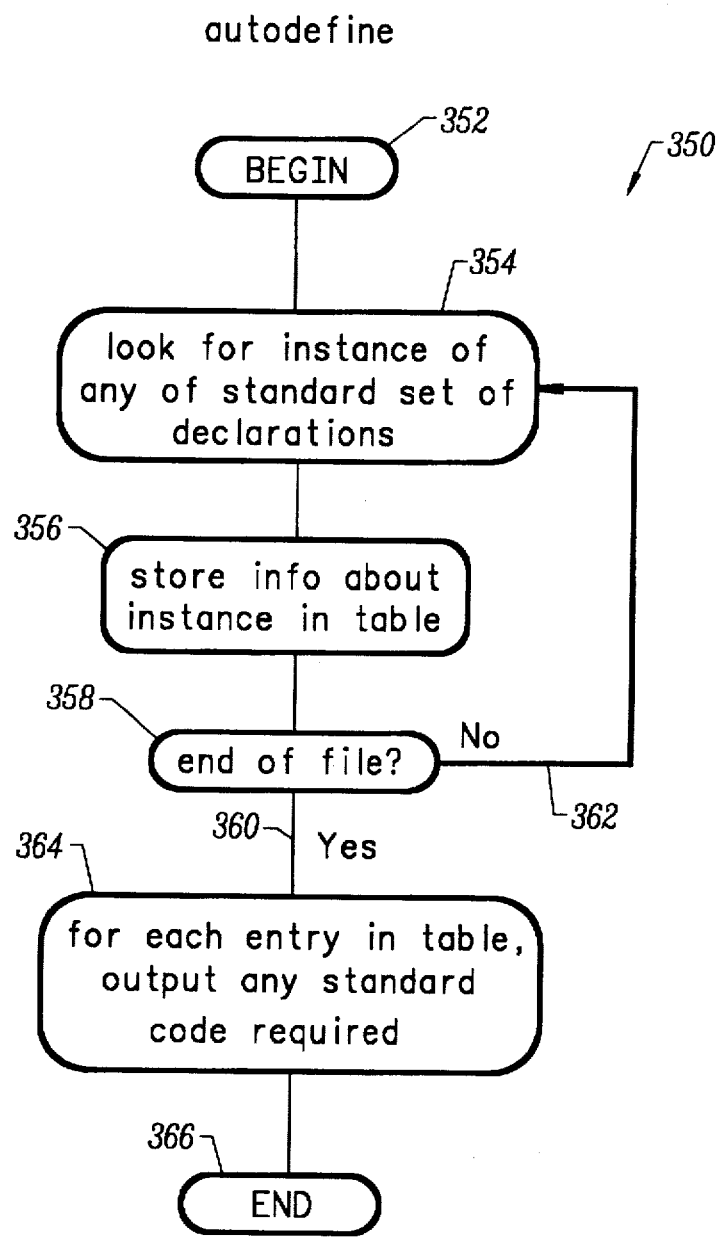
FIG. 18 illustrates a flow chart for the autodefine program.

Referring now to FIG. 13, the process followed by a subsequent programmer 250 to make a shadow data structure from some pre-existing shadowable data structure is depicted. The programmer writes header files 254 to describe the objects that go to make up the shadow data structure. These header files may reference the header files (204 in FIG. 11) supplied by the programmer of the original data structure. Since the shadow data structure is composed of objects, the programmer also writes code files 256 for the methods of these objects. These code files 256 will reference the header files supplied by the programmer of the original data structure (212 in FIG. 11). The code for the "shadow factory" methods are also written 258. The header files 254 are combined with the header files 214 (in both FIGS. 11 and 13) and passed through the utility "autodefine" 260 to generate the boilerplate code to produce the shadow data structure. The C++ code output by "autodefine" and the newly written code files 256 along with all of the header files are compiled together 262 and the outputted object code 263 is combined with the object code supplied 220 (in both FIGS. 11 and 13) and linked together to form a program 264. This program is then executed 266 in FIG. 13 and as shown in 270 in FIG. 14. Referring now to FIG. 14, during the program execution, a shadowable original data structure is created 274, a shadow data structure is created 276, and the shadowed data structure is executed 278. The subroutine to create the shadow data structure (276 in FIG. 14) is now described in more detail with reference to FIG. 15. In FIG. 15, the subroutine 290 when called 292 first creates a shadow map and associated shadow factory if it has not already done so 294. Then the subroutine 290 determines whether the original data structure node in question has been registered in the shadow map 296. If so 299 the subroutine returns the value registered (pointer) in the shadow map against the node in question 304, to the caller of the subroutine and exits 306. If however, the original data structure node in question has not been registered in the shadow map 298, then the "create_shadow" method is called for the node, according to the node's type 300. This creates a shadow node and the result (pointer to the shadow node) is registered in the shadow map 302. This value then is returned to the caller of the subroutine 304 and the subroutine exits 306. The details of the "create_shadow" method (300 in FIG. 15) is now described with reference to FIG. 16. In FIG. 16, when the "create_shadow" method 310 is called 312, the implementation first determines the true type of the referenced node 314. A method is called on the shadow factory appropriate to the type of the referenced node object 316 to create a shadow node, and the newly created shadow node reference is returned to the caller 318 and the "create_shadow" method exits 320. The details of the method for the shadow factory (316 in FIG. 16) are shown in FIG. 17. In FIG. 17, the shadow factory method 330, when called 332, checks the shadowable node to see if there are any child nodes of the specified node which must be shadowed 334. If so, the subroutine is run to create shadow nodes for the child nodes of the original data structure 336. In so doing this step determines whether a loop would be caused and records the arguments for later processing. Finally the shadow factory implementation creates the shadow node from shadowed children and from other non-shadowable information from the shadowable node 338 and exits 340.

Example:

Shadow methods and ways of generating shadow nodes

Continuing the example above, involving classes A, B, C, and D, that inherit from "Roman", suppose we wish to make a shadow involving nodes Alpha, Beta, Gamma, and Delta, that have a common root node, "Greek". Then, picking "Alpha" as an example, its "shadow" method might be defined as:

```
class Alpha
{
public:
// other Alpha methods. . .
static Alpha *shadow(A *a, Roman_ShadowMap *map);
};
```

Now a definition of a factory class is needed, such as "GreekFromRoman_ShadowMap" that is an implementation of the class "Roman_ShadowMap". Note that that class merely declared abstract (or default) "shadow T" methods for the various sub types of the root node, "Roman". It did not embody any knowledge of the types of the shadow nodes to be created; that knowledge will be embodied in the implementation of the methods of "GreekFromRoman_ShadowMap".

This is what the definition of the class "GreekFromRoman_ShadowMap" might look like.

```
class GreekFromRoman_ShadowMap:
    public virtual Roman_ShadowMap
{
public:
// Roman_ShadowMap methods defined by this class:
Narrowable   *shadowA(A *);
Narrowable   *shadowB(B *);
Narrowable   *shadowC(C *);
Narrowable   *shadowD(D *);
};
```

If the shadow map being inherited has only pure virtual methods, then all of those methods will need to be implemented here. If there are any default implementations, then it may not be necessary to implement all of the methods here. Default factory methods for a shadow map are described below.

There are several paradigms that can be used, and the examples that follow should be considered merely illustrative of the techniques that can be used. Which paradigm is appropriate in any particular situation will be a matter of personal taste and considerations of how to group the shadowing code: all together, or with the code for the nodes to be shadowed.

Shadowing instance data within the factory method for a shadow node

Suppose we wish to shadow an A object into an Alpha object, and that an A object has two members, of type B* and C* that are both to be shadowed into the Alpha object. Then, assuming suitable access functions and constructors, the factory method could be written in the following way:

```
Narrowable *GreekFromRoman_ShadowMap:: shadowA (A *a)
{
Beta *beta = Beta::shadow(a->get_b(), this);
Gamma *gamma = Gamma::shadow(a->get_c(), this);
return new Alpha (beta, gamma);
};
```

The method shadows the child members of A, recursively invoking the shadow machinery for the children and calling a constructor on the result. Not all children need be shadowed if there is no need for them in the shadow node. Some members may not be shadowable: for example, basic types, enumerated values, strings and so on. These members can either be copied across to the shadow node directly, or a back pointer to the original node can be stored in the shadow, so that the shadow can get at these members by following the back pointer. The decision of which way to store them should be made by taking considerations of space and access time into account.

Just as not all members of the original node may be shadowed, so not all members of the shadow node may be the result of shadowing members from the original node. Storing a back pointer is a very simple example. Alternatively, some members of the shadow node may be the result of computing and caching a complex expression involving one or more members of the original node.

Shadowing instance data within a constructor for a shadow node

Instead of shadowing the children in the factory method, the shadowing can be done in the constructor for the shadow node itself:

```
Narrowable *GreekFromRoman_ShadowMap::shadowA(A *a)
{
    return new Alpha (a, this);
};
Alpha::Alpha (A *a, Roman_ShadowMap *map)
    :beta(Beta::shadow(a->get_b(), map)),
    gamma(Gamma::shadow(a->get_c(), map))
{};
```

Performing the shadowing in the constructor keeps the conversion code close to the rest of the code for Alpha, whereas performing the shadowing in the factory, groups all of the shadowing code (for all classes) together.

Shadowing instance data within a static method of the shadow node

Having the factory method call the constructor for the shadow node implies that the factory knows exactly what the shadow type really will be, as indicated by the calls of "new Alpha.( . . . )". Another solution is to use a static create method on the Alpha class. This keeps the factory code simple, without binding in knowledge of a concrete type.

```
Narrowable *GreekFromRoman_ShadowMap::shadowA(A *a)
{
    return Alpha::create(a, this);
};
Alpha *Alpha::create(A *a, Roman_ShadowMap *map)
{
    Beta *beta = Beta::shadow(a->get_b(), map);
    Gamma *gamma = Gamma::shadow(a->getc(), map);
    return new Alpha (beta, gamma);
};
```

Example:
Generating different types of shadow node

There was an example above concerning a compiler parse tree node of type "PT_BinaryExpr" that is to be shadowed into one of a number of different types, depending on the binary operation.

Here is how that might be implemented, using a static create method in the shadow class.

```
CG_Expr *CGBinaryExpr::create(PT_BinaryExpr *be,
                              PT_ShadowMap *map)
{
    CG_Expr *left = CGExpr::shadow(be->get_get_left(), map);
    CG_Expr *right = CGExpr::shadow(be->get_right(), map);
    switch (be->get_op()) {
```

-continued

```
    case Op:: Add:
        return new CG_AddExpr(left, right);
    case Op::Sub:
        return new CG_SubExpr(left, right);
    case Op::Mult:
        return new CG_MultExpr(left, right);
    case Op::Div:
        return new CG_DivExpr(left, right);
    default:
        should_not_happen();
    }
};
```

Note that the body of this method could also be put into the factory method shadowPT_BinaryExpr. The choice of where to locate the code is mostly one of style, although by making it a method on PT_BinaryExpr, it is possible that a more sophisticated example would be able to make use of other methods defined in the class which might only be privately accessible.

Lazy shadows for cyclic data

The various examples of making shadows shown above also used the primitive operation "T::shadow". As was noted in the explanation above, this will likely cause recursive calls on shadow for all the children of the node being shadowed. The corollary is that when shadowing a node, the transitive closure of all children of that node will also be shadowed. This will work provided the data structure is acyclic. If the data structure is cyclic, then the recursive processing scheme will not terminate, and will eventually run out of memory.

"Lazy shadows" provide a way around these problems. They should be used if the data has (or might have) cycles; they can also be used if it is not necessary or desirable to shadow all of a data structure up front.

If "T" is a type of node to be shadowed and "T'" is the type of the shadow node for T, then "LazyShadow<T', T>" is a template for a smart pointer that lazily evaluates "T::shadow". The smart pointer is initialized with the two arguments for "T::shadow:" a "T*" pointer and a "ShadowMap*". It can be assigned to a T' pointer, and can be transparently dereferenced as a T' pointer; both of these operations will cause the shadow to be evaluated. Consider the following code, written without using lazy shadows.

```
Narrowable *GreekFromRoman_ShadowMap::shadowA(A *a)
{
    return new Alpha(a, this);
}
class Alpha
{
public:
            Alpha::Alpha(A *a, Roman_ShadowMap *map);
            void print();
private:
            Beta *beta;
            Gamma *gamma;
};

Alpha::Alpha(A *a, Roman_ShadowMap *map)
        :   beta(beta::shadow(a->get_b(), map)),
            gamma(Gamma::shadow(a->get_c(), map))
{}
void Alpha::print()
{
            Beta *beta2 = beta;
            gamma->print();
};
```

If for some reason it becomes necessary or desirable to use lazy shadows for the child nodes of class Alpha, here is how the code might change.

```
class Alpha
{
public:
        Alpha::Alpha(A *a, Roman_ShadowMap *map);
        void print()
private
        LazyShadow<Beta,B>beta;          // was Beta *beta;
        LazyShadow<Gamma,C>gamma;        // was Gamma *gamma;
};
Alpha::Alpha(A *a, Roman_ShadowMap *map)
        :beta(a->get_b(), map),          // shadow call removed
        gamma(a->get_c(), map() // shadow call removed
{}
```

The method "GreekFromRoman_ShadowMap::shadowA" remains unchanged. The implementation of "Alpha::print" also remains unchanged, because "beta" can be transparently converted to and used as a "Beta*" pointer, just as "gamma" can be converted to a "Gamma*" one. The first time "beta" is converted to a "Beta*" pointer, the call of "Beta::shadow(a->get_b(), map)" will finally occur; however, subsequent uses of "beta" will bypass the call and will be almost as fast as using the evaluated pointer.

Instantiating a shadow of a data structure(Or: What the end client actually needs to know.)

Most of the apparatus needed to instantiate a shadow of a data structure in the preferred embodiment has been shown. Those skilled in these arts will recognize any number of alternative embodiments. However, in the preferred embodiment, additionally, to shadow a data structure a client needs the following:

- a root pointer to the data structure to be shadowed, or to a part of the data structure to be shadowed
- the shadow map subtype for the appropriate shadow type space The following is a typical code sequence used to instantiate a shadow:

```
A *a=...
        // get pointer to data structure to be shadowed
Roman_ShadowMap *map = new GreekFromRoman_ShadowMap;
Alpha *alpha = Alpha::shadow(a, map);
        //that's all there is to it
```

This works as follows: after getting a pointer to the node to be shadowed, the code creates an instance of the appropriate subtype of "ShadowMap", and then simply shadows the root pointer, using exactly the same method we have already seen when shadowing the child members of a node being shadowed. The result is that "alpha" is a root pointer to a shadow data structure as defined by the "GreekFromRoman_ShadowMap" object.

Once the node has been shadowed, it depends on the specification of "GreekFromRoman_ShadowMap" as to when the map can be deleted. If the "alpha" shadow node has been fully evaluated, containing no internal lazy shadows and with no other implicit dependency on the map, then the map can indeed be deleted. However, a client may choose to keep the map available to shadow other nodes, in which case some or all of the saved entries in the map may speed up subsequent shadow operations.

Additional Information for the Preferred Embodiment

The above disclosure has given an overview of the entire mechanism, and details of what is needed both to make a data structure shadowable and to actually make a shadow. This section describes the glue code needed to make the various elements of code come together in the preferred embodiment.

Following the execution of the two lines of example code from the previous page:

```
Roman_ShadowMap *map= new GreekFromRoman_ShadowMap;
Alpha *alpha = Alpha::shadow(a, map);
        // that's all there is to it
```

Creating a shadow map

The call of new "GreekFromRoman_ShadowMap" constructs an instance of an implementation of a subtype of "ShadowMap" that can be used to generate a 'greek' shadow of 'roman' nodes. The call will automatically initialize a table in the ShadowMap base class that will be used to cache the results of calling the factory methods provided by the subtype.

Creating a shadow node

The shadow node is created by invoking the shadow method on the required type. This is a class-static method whose implementation is of the form:

```
T' *T'::shadow(T *x, TRoot_ShadowMap *m)
{
        return T'::narrow(m->lookup_or_create_shadow(x));
}
```

The map is interrogated for the shadow of "x" by the call of "m->lookup_or_create_shadow(x)".

The result of "lookup_or_create_shadow" is of type "Narrowable*", since the map cannot know the type that will actually be required. The result is therefore narrowed to the correct type by calling "T'::narrow". Assuming the shadow has been created correctly, this will give the required result. Otherwise, zero will be returned.

Ignoring some minor complexity to deal with detecting cycles while creating shadows, the call of "lookup_or_create_shadow" checks to see if a shadow node is already registered for the argument, and if not, it takes steps to create the shadow node. Somewhat simplified, the code looks like the following:

```
Narrowable *ShadowMap::lookup_or_create_shadow(Shadowable *sp)
{
        Narrowable *np;
        if(sp == 0)return 0;
        if (!tbl->get_shadow(sp, np)) {
                np = sp->create_shadow(this);
                tbl->set_shadow(sp, np);
        }
        return np;
}
```

The following notes are of interest in further explaining the above:

tbl

This represents the table that contains the results of earlier calls to lookup_or_create_shadow.

tbl->get_shadow(sp, np)

This looks up the shadow of "sp", sets "np" and returns TRUE if it is found, and otherwise leaves "np" alone and returns FALSE.

tbl->set_shadow(sp, np)

This records "np" as the shadow of "sp".

The major line that needs explaining is this one:

np=sp->create_shadow(this);

This is the means by which the shadow mechanism correctly creates the appropriate type of shadow node, independently of the perceived type of the object. The client may have a "B*" pointer that in reality points to a "D" object. Nevertheless, the client may well invoke "Beta::shadow(b, map)" and will expect to receive a Beta object even though the real type of the object being shadowed is a D and the real type of the shadow node must be a Delta.

"create_shadow" is a virtual method of the node being shadowed. It is implemented for each type of object being shadowed, and looks like this:

```
Narrowable *D::create_shadow(ShadowMap *map)
{
    Roman_ShadowMap *m = Roman_ShadowMap::narrow(map);
    return m->shadowD(this, map);
}
```

Note that the argument is only of type "ShadowMap*" and not of type "Roman_ShadowMap*". This is a regrettable consequence of "create_shadow" being inherited from "Shadowable", which only knows about "ShadowMap."

When "sp->create_shadow(this)" is invoked, the message will be received by the true type of the object, in its implementation of "create_shadow." This knowledge of the true type is passed on to the map by invoking a method specific to the true type. This is the purpose of the call:

m->shadowD(this)

Since this is a call to shadow a "Roman" node (D), this is a method on the "Roman_ShadowMap", which is the reason for the "narrow" call in the previous line of code. Note that map is not narrowed to the actual implementation type of the shadow map, since that is neither known nor necessary; it is merely narrowed to the type that defines the abstract methods to shadow the various types.

Typically, the call of "m->shadowD(this)" will be implemented by a subtype of "Roman_ShadowMap" that provides the knowledge of how to shadow a D node into the appropriate shadow type. In our running example, the call would be handled by "GreekFromRoman_ShadowMap::shadowD", of which we have already seen the like. (See the discussion on the implementation of shadowA above.)

The result of the shadow call on the map is of type "Narrowable*". The result is passed back to "ShadowMap::lookup_or_create_shadow", which saves the value for future use, and returns it, still as a "Narrowable*", to the original call of shadow on the target type. This attempts to narrow to the appropriate type the value that has been passed back. If the narrow call succeeds, the client has the value that was wanted; if not, then zero is returned, which should be interpreted as meaning that either the item being shadowed was itself zero, or that the item cannot be shadowed to the requested type. If it is important to distinguish these cases, the client can easily check if the item being shadowed is zero or not.

It is worth checking what happens in the face of inheritance and widened pointers. Assume the client has in his hand a B* pointer to a D object. As a B* pointer, it is to be expected that the shadow will be a Beta* pointer. Therefore, "Beta::shadow(b, map)" will be called. Assuming this is the first shadow call on "b", "ShadowMap::lookup_or_create_shadow" will invoke "create_shadow" on "b", which will be handled by the true type D, by way of the virtual function dispatch. This will call the factory to shadowD. Thus the shadow node will be created with the correct shadow type. The pointer to the shadow node (e.g. a Delta*) will be passed back as a "Narrowable*", and narrowed to Beta* in the code for "Beta::shadow". Thus the mapping between node type and shadow node type is maintained for both the true and perceived type of the objects involved.

Who does what

There are many different parts to the shadow system disclosed herein, with the code for the various parts being the responsibility of various different authors in the preferred embodiment. There are at least three authors involved: the author of the standard shadow code, the author of the data structure being shadowed and the author of the shadow data structure itself.

In addition, some of the code can be mechanically generated by a special utility called autodefine which is described in Appendix B. Also described in Appendix A is additional explanatory information on the "Narrow" implementation used in the preferred embodiment.

Referring to FIG. 19 a table describes the various components of the shadow system and identifies the responsibility for the various parts in the preferred embodiment.

Default factory methods on a shadow map

The disclosure of the preferred embodiment above described the actions necessary make a data structure shadowable, and introduced the need for a subtype of "ShadowMap" that declared a "shadowT" method for each class "T" in the data structure that needed to be shadowed.

The disclosure above indicated that these methods could be pure virtual methods, and that the class could be automatically generated by "autodefine". The following illustrates how default methods on the "ShadowMap" subtype may be used to advantage.

The examples so far have suggested that each type in the data structure has one or more corresponding types in the shadow data structure: examples of both 1–1 and 1-many mappings were illustrated. However, many-1 mappings (and even many—many mappings) are also possible.

Figure 20:
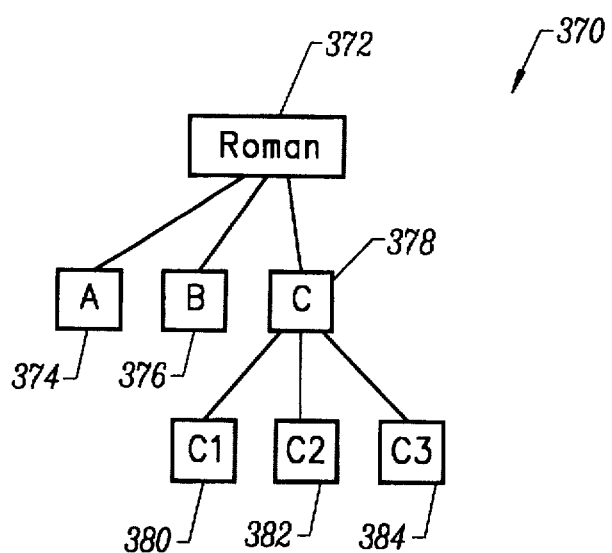
FIG. 20 illustrates an exemplary inheritance data structure.

Consider the inheritance hierarchy 370 shown in FIG. 20. Nodes A 373, B 376, and C 378 inherit from "Roman" 372; and nodes C1 380, C2 382 and C3 384 inherit from C 378.

For a particular shadow of a data structure built from these data types, it may be the case that we do not need to shadow all of the information in types C1 380, C2 and C3 384: it might be sufficient just to shadow the properties they have as C 378 objects. In order words, rather than shadowing C1 to Gamma1 C2 to Gamma2, and C3 to Gamma3, we wish to shadow all C nodes to Gamma nodes.

Since we wish to shadow nodes of these types to Gamma nodes, it is appropriate to call "Gamma:: shadow (C*, Roman_ShadowMap*)". Assuming this is the first shadow call on the C * argument, this will call through the virtual create_shadow method, and that call will be received by the true type of the object: C1, C2 or C3. Whichever type receives the call will pass it on to the appropriate method on the factory: shadowC1, shadowC2 or shadowC3.

If the methods on the "Roman_ShadowMap" are all pure virtual methods, then they must all be separately implemented by the actual map used for the specific shadow. However, if the methods on "Roman_ShadowMap" have a default implementation, then they do not need to be overridden in the actual map used. In this case, what is wanted is for shadowC1, shadowC2 and shadowC3 all to delegate to shadowC. This means that in the actual map to be used, only shadowC need be provided, and this can do what is necessary to shadow any C objects, whether they be C, C1, C2 or C3 objects.

Based on this rationale, the following rule is implemented by autodefine in the present embodiment when generating the "TRoot_ShadowMap" for a collection of types inheriting from TRoot. The default implementation for each shadowT method is to delegate to the immediate parent type, in the case of single inheritance, or to the leftmost immediate parent, in the case of multiple inheritance. ("Autodefine" in the preferred embodiment also has an option to make the methods on the "TRoot_ShadowMap" class be pure virtual methods. It should also be noted that "autodefine", in the preferred embodiment, does not notice inherited template types.) The one exception is the shadowTRoot method, to which all methods will eventually delegate if not overridden, and this method will abort if invoked. It is up to the client to ensure that this abort does not get called: either by overriding it, or by ensuring that no instances of TRoot are allocated and that all subtypes of TRoot have overridden appropriate shadowT methods in the map.

Shadows of shadows

If some data structure is shadowed to yield a new data structure, there is no reason why that new data structure should not itself be shadowable. All that is required is that the base type of the nodes in the new data structure should inherit from Shadowable, and that the nodes should implement create_shadow.

A sequence of shadows could be used (for example) to represent the transformations involved in a compilation pipeline, going from syntax tree to machine code instructions. In this case, the job of fabricating the shadow nodes at each stage would probably be non-trivial, but there is no inherent reason why this could not be done.

A variant of this is that a shadow might provide methods that, when invoked, cause a different data structure to be created, and this resultant data structure might itself be shadowable.

Passing extra parameters to the shadow call

When shadowing a node, it is sometimes useful to be able to pass additional information to the call that will fabricate the shadow node. This may be information needed globally by the whole shadow (such as a window handle or error stream) or it may be needed by a specific type and a specific shadow call.

If this is necessary, such information can be stored as instance data of the actual implementation of the ShadowMap. This means that the information will be available in any call of shadowT that may subsequently be invoked.

Information that is global to the shadowing process can be stored as instance data in the map when the map is constructed. Information that is needed on a per-node basis requires a little more care. The easy solution is to provide access methods on the factory that directly allow the extra instance data to be accessed and modified throughout the shadowing process. However, if this technique is used, there is a serious potential for an undetected programmer error. Consider the following scenario:

```
Inside some call of "Tx': : shadow Tx *X, TRoot_ShadowMap *map)"
  - set instance data "d" on the map: "map->set_data(d)"
  - call "Ty': :shadow(y, map)" to shadow some child "y"
```

The problem is that there is no inherent guarantee that the final call of "Ty'::shadow (y, map)" will see the data "d". If by some programmer error the shadow call has already been executed for the value y, then an entry will exist in the map and subsequent calls will return that value, and will not go through the factory method and pick up the data. In addition, it is clumsy for the client to have to call two methods: one to set the data and another to shadow the desired node. What is required is a slightly different mechanism that is easier to use and which provides better semantic guarantees.

In the preferred embodiment, the solution is to provide methods on the map that set the instance data and shadow the node in one single operation. Since the reason for these methods is to have extra shadow-specific parameters, these are methods defined directly on the implementation of the shadow map, and are not inherited at all. For example, the lines above could be replaced by a method defined as follows:

```
class TRoot'_from_TRoot_ShadowMap
{
public:
  Ty' *create_Ty_shadow(Ty *y,Data *d);
  // rest of class. . .
private:
  Data *data_for_create_Ty_shadow;
};
```

The implementation of

Ty' *create_Ty_shadow(Ty *y, Data *d) can set the instance variable "data_for_create_Ty_shadow" and must then cause a shadow to be created. Whilst it can do that by explicitly calling Ty'::shadow(y, map)

there is another method on ShadowMap that is more suitable. Internally, "Ty'::shadow(y, map)" calls Ty'::narrow (map->lookup_or_create_shadow (y))

and as we have seen, this returns the value stored in the map if it already exists. The alternative is to replace the call of "Ty'::shadow (y, map)" by the following y'=Ty'::narrow (map->create_shadow (y));

The call of "map->lookup_or_create_shadow(y)" has been replaced by a call to the sibling method "map->create_shadow(y)", which still looks up y in the map, but this time to check that no value is already stored in there. It is a run-time error if a value is found. Assuming no entry is found, the code will then internally call y->create_shadow (map)

which, as before, will call back into one of the shadowT methods on the map. These all have access to the data d and can fabricate the shadow node correctly, based on the type of the node and the contextual information passed in from the client.

The name "create_Ty_shadow" is the choice of the author of the shadow map implementation class, in this case "TRoot'_from_TRoot_ShadowMap". It is specific to the implementation class and not inherited at all. It is suggested that it not be an overloaded name in case the implementation class is ever extended by implementation inheritance to shadow even more types.

Although the present invention has been described with reference to particular operating systems, compilers, program code mechanisms, and object and object reference definitions, it will be appreciated by one skilled in the art that the present invention may be implemented in any one of a number of variations within a given operating environment, or in different operating system or object system environments. Similarly, particular computer client and server configurations or combinations illustrated are only representative of one of many such configurations of clients and servers and object and sub-object relationships which may use the present invention. Moreover, it will be understood that the figures are for illustration only and should not be taken as limitations on the invention. Some additional applications of the shadows techniques disclosed herein include the following:

A compiler's ASG can be shadowed with a data structure that more closely matches the requirement of a code generator. (For example, additional methods may be added to nodes to translate the program fragment represented by the node to machine code.);

A compiler's ASG can be shadowed with a data structure that provides browsing capabilities over the program;

A compiler's ASG can be shadowed with a data structure that enables the ASG to be edited. The shadow nodes would contain some textual rendition of the nodes, the text could be edited, and then parsed back to an ASG;

A compiler's ASG can be shadowed with a data structure that can be used as the input to an interpreter, to execute the program;

The schematics for the design of an integrated circuit can be represented as a connected collection of typed objects. Such data structures could be made shadowable to permit an extensible collection of tools to manipulate the data structure. For example, such tools as various design rule checkers for different manufacturing processes could be used. As another example the data structure may be shadowed into the form of data structure representing the information needed for a particular foundry to manufacture the chip;

Today, word processors manipulate complex structured documents. By making the document structure shadowable, various tools can be added to process the document, without building these tools into the one word processing program. Such tools might be style checkers, spelling checkers, cross-referencing programs, index construction, and converting to formats for other word processing programs.

These possible uses of the Shadow technique are not intended to limit in any way the possible uses of the Shadow functions as disclosed herein, but merely represent some examples which those skilled in these arts will recognize as merely exemplary.

What is claimed is:

1. A computer implemented method comprising the steps of:
    providing a first data-structure having a first node;
    constructing a shadow data-structure which is related to said first data-structure by calling a shadow map which is operative to create a shadow node for said shadow data-structure that corresponds to the first node and to create and store a plurality of pointer mechanisms; and
    using said shadow map to relate the shadow node to the first node through the use of the plurality of pointer mechanisms, wherein a first one of the pointer mechanisms points to the first node in said first data-structure and a second one of the pointer mechanisms points to the shadow node in said shadow data-structure wherein a first method operative to look-up a shadow node in said shadow-map is used to determine whether an entry exist which points to said shadow node, and if said entry which points to said shadow node does not exist, said first method will create a new shadow node.

2. The computer implemented method described in claim 1 further comprising a step of using said shadow data-structure as an executable variation of said first data-structure.

3. The computer implemented method described in claim 1 wherein said first data structure and said shadow data-structure are connected collections of object-oriented programming objects.

4. The computer implemented method described in claim 3 wherein said shadow node is an object-oriented programming object, and said first node in said first data-structure is an object-oriented programming object.

5. The computer implemented method described in claim 1 where said step of constructing a second data-structure comprises the steps of calling upon a factory method and caching results from said call to said factory method in said shadow-map.

6. The computer implemented method described in claim 1 where in said shadow-map is represented by a first object-oriented programming object which includes the first method.

7. The computer implemented method described in claim 6 wherein said first method, upon determining that an entry exists which points to said shadow node, returns said pointer to said shadow node to an originator of a look-up call.

8. The computer implemented method described in claim 6 wherein said first method, upon creating a new shadow node, also creates a new entry in said shadow-map pointing to said new shadow node, and said first method returns said new pointer to said new shadow node to an originator of a look-up call.

9. The computer implemented method described in claim 1 wherein said first data structure is shadowable.

10. A computer implemented method comprising the steps of:
    providing a first data-structure having a first node, wherein the first data structure and the first node are object-oriented programming objects;
    constructing a shadow data-structure which is related to said first data-structure by calling a shadow map which is operative to create a shadow node for said shadow data-structure that corresponds to the first node and to create and store a plurality of pointer mechanisms, wherein the shadow data-structure and the shadow node are object-oriented programing object; and
    using said shadow map to relate the shadow node to the first node through the use of the plurality of pointer mechanisms, wherein a first one of the pointer mechanisms points to the first node in said first data-structure and a second one of the pointer mechanisms points to the shadow node in said shadow data-structure; and
    making a particular node in said first data-structure shadowable by,
        implementing in said particular node of said first data-structure, a create_shadow method, wherein said create_shadow method calls a second method on an object-oriented programming object which represents said shadow-map, said second method operative to fabricate a shadow node by passing in an object type of said particular node, and
        providing an object-oriented programming object which defines a method for each node type to be shadowed.

11. The computer implemented method described in claim 10 wherein said create_shadow method is a virtual method.

12. A computer implemented method for creating a shadow data-structure of an existing data-structure, said method comprising the steps of:
    providing a shadowable first data-structure;
    creating a shadow node for each node of said shadow able first data-structure by calling a shadow-map which is operative to create and store a pair of pointers, each of said pointers being operative to identify an element in a data-structure; and relating each of said shadow nodes in said second data-structure to a corresponding node in said shadowable first data-structure by means of said pair of pointers in said shadow-map, wherein a first method operative to look-up a shadow node in said shadow-map is used to determine whether an entry which points to said shadow node, and it said entry which points to said node does not exist, said first method will create a new shadow node.

13. The computer implemented method for creating a shadow data-structure of an existing data-structure described in claim 12 comprising the additional step of:

using said shadow-map to relate an element in said second data-structure to a corresponding element in said first data-structure by means of said pair of pointers, a first of said pair of pointers pointing to an element in said first data-structure and a second of said pair of pointers pointing to an element in said second data-structure.

14. The computer implemented method for creating a shadow data-structure of an existing data-structure described in claim 12 wherein said shadow-map is represented by a first object-oriented programming object which includes the first method.

15. The computer implemented method for creating a shadow data-structure of an existing data-structure described in claim 14 comprising an additional step of, said first method, upon creating a new shadow node, also creating a new entry in said shadow-map pointing to said new shadow node, and said first method returning said new pointer to said new shadow node to an originator of a look-up call.

16. The computer implemented method for creating a shadow data-structure of an existing data-structure described in claim 14 wherein said step of providing a shadowable data-structure comprises the step of making a particular node in said first data-structure shadowable by:

implementing in said particular node of said first data-structure, a create_shadow method, wherein said create_shadow method calls a second method on an object-oriented programming object which represents said shadow-map, said second method operative to fabricate a shadow node by passing in an object type of said particular node; and providing an object-oriented programming object which defines a method for each node type to be shadowed.

17. The computer implemented method for creating a shadow data-structure of an existing data-structure described in claim 16 wherein said create_shadow method is a virtual method.

18. A System for extending the use of a data-structure comprising:

a computer;

a first data-structure coupled to said computer, the first data-structure including a first node that is an object-oriented programming object;

a device, coupled to said computer, which is operative to create a shadow data-structure, and to relate a shadow node in said second data-structure to the first node in said first data-structure by means of a pointing structure, a first element of said pointing structure pointing to the first node and a second element of said pointing structure pointing to the shadow node in said shadow data-structure wherein the shadow node is an object oriented programming object and the first and second data structures are collections of object-oriented programming objects; and a computer code device, coupled to said shadow data-structure, for using said shadow data-structure as an executable variation of said first data-structure; and a first object-oriented programming object suitable for coupling to said shadow-map device, said first object-oriented programming object including a first method, said first method operative to look-up a shadow node in said shadow-map device to determine whether an entry exists which points to said shadow node, and if said entry which point to said shadow node does not exist, said first method operative to create a new shadow node.

19. The System for dynamically extending the use of a data-structure described in claim 18 wherein said device is a shadow-map device that comprises a factory object coupled to said shadow-map device, and a caching device coupled to said shadow-map device for caching results from a call to said factory object.

20. The System for dynamically extending the use of a data-structure described in claim 18 wherein said first method is also operative to create a new entry in said shadow-map device when creating a new shadow node, said new entry in said shadow-map device pointing to said new shadow node, and said first method is also operative to return said new pointer to said new shadow node to an originator of a look-up call.

21. A System for dynamically extending the use of a data-structure comprising:

a computer;

a first data-structure coupled to said computer, the first data-structure including a first node that is an object-oriented programming object;

a device coupled to said computer, which is operative to create a shadow data-structure, and to relate a shadow node in said second data-structure to the first node in said first data-structure program by means of a pointing structure, a first element of said pointing structure pointing to the first node and a second element of said pointing structure pointing to the shadow node in said shadow data-structure, wherein the shadow node is an object oriented programming object and the first and second data structures are collections of object-oriented programming objects; and a second program code device coupled to said computer, for making a particular node in said first data-structure shadowable, said second program code device having a third program code device for implementing in said particular node of said first data-structure, a create_shadow method, where in said create_shadow method is operative to call a second method on an object-oriented programming object which represents said shadow-map device, said second method operative to fabricate a shadow node by passing in an object type of said particular node;

and a fourth program code device, coupled to said third program code device, for providing an object-oriented programming object which defines a method for each node type to be shadowed.

22. The System for dynamically extending the use of a data-structure described in claim 21 wherein said create_shadow method is a virtual method.

23. A computer mechanism for projecting a first data-structure of object-oriented programming objects from one type space to another type space compromising:

a first program code mechanism operative to convert said first data-structure of objects into a shadowable data-structure of objects;

a device, coupled to said computer mechanism, which is operative to create a shadow data-structure of objects, and to relate a shadow node in said shadow data-structure to a corresponding first node in said first data-structure by means of a pointing structure, a first element of said pointing structure pointing to the node in said first data-structure and a second element of said pointing structure pointing to the shadow node in said shadow data-structure;

a computer code device, coupled to said shadow data-structure, for using said shadow data-structure as an executable variation of said first data-structure; and a second program code mechanism operative to look-up a shadow node in said device to determine whether an entry exists which points to said shadow node, wherein if said entry which points to said shadow node does not exist, the second program code mechanism is operative to create a new shadow node.

* * * * *